(12) United States Patent  (10) Patent No.: US 9,165,153 B2
Fielder  (45) Date of Patent: Oct. 20, 2015

(54) SYSTEM AND METHOD FOR PROTECTING SECRETS FILE

(71) Applicant: Guy Fielder, Austin, TX (US)

(72) Inventor: Guy Fielder, Austin, TX (US)

(73) Assignee: PACID TECHNOLOGIES, LLC, Austin, TX (US)

(*) Notice: Subject to any disclaimer, the term of this patent is extended or adjusted under 35 U.S.C. 154(b) by 8 days.

(21) Appl. No.: 14/228,463

(22) Filed: Mar. 28, 2014

(65) Prior Publication Data

US 2014/0298036 A1  Oct. 2, 2014

Related U.S. Application Data

(63) Continuation of application No. 13/203,327, filed as application No. PCT/US2010/028562 on Mar. 25, 2010, now Pat. No. 8,726,032.

(60) Provisional application No. 61/163,406, filed on Mar. 25, 2009.

(51) Int. Cl.
*H04L 9/32* (2006.01)
*G06F 21/62* (2013.01)

(52) U.S. Cl.
CPC ............ *G06F 21/6209* (2013.01); *G06F 21/62* (2013.01); *G06F 2221/2123* (2013.01)

(58) Field of Classification Search
CPC ............ H04L 2463/101; H04L 2209/60; G06F 21/6218; G06F 21/602; G06F 21/60; G06F 21/62; G06F 21/6209; G06F 2221/2123

USPC ................ 713/168, 171, 169, 181, 156, 189; 370/338; 709/204
See application file for complete search history.

(56) References Cited

U.S. PATENT DOCUMENTS

| 4,613,901 A | 9/1986 | Gilhousen et al. |
| 4,649,233 A | 3/1987 | Bass et al. |
| 4,720,860 A | 1/1988 | Weiss |
| 4,864,615 A | 9/1989 | Bennett et al. |
| 4,924,515 A | 5/1990 | Matyas et al. |
| 4,937,866 A | 6/1990 | Crowther et al. |
| 5,020,105 A | 5/1991 | Rosen et al. |
| 5,060,263 A | 10/1991 | Bosen et al. |

(Continued)

FOREIGN PATENT DOCUMENTS

| EP | 1304848 A2 | 4/2003 |
| EP | 1478156 A2 | 11/2004 |

(Continued)

OTHER PUBLICATIONS

International Search Report and the Written Opinion issued in PCT/US2010/028583; Dated: Jul. 6, 2010; (21 pages).

(Continued)

*Primary Examiner* — Brian Shaw
(74) *Attorney, Agent, or Firm* — Ascenda Law Group, PC

(57) ABSTRACT

A method for protecting a first secrets file. The method includes an n-bit generator generating a secrets file name for the secrets file and generating a decoy file names for decoy files. The secrets file includes a secret. Each of the decoy files includes decoy file contents, are a same size as the secrets file, and is associated with a modification time within a range of modification times. The modification time of the secrets file is within the range of modification times. The secrets file and decoy files are stored in a secrets directory.

19 Claims, 14 Drawing Sheets

(56) References Cited

U.S. PATENT DOCUMENTS

| | | | |
|---|---|---|---|
| 5,065,429 A | 11/1991 | Lang |
| 5,068,894 A | 11/1991 | Hoppe |
| 5,153,919 A | 10/1992 | Reeds, III et al. |
| 5,233,655 A | 8/1993 | Shapiro |
| 5,237,610 A | 8/1993 | Gammie et al. |
| 5,241,598 A | 8/1993 | Raith |
| 5,309,516 A | 5/1994 | Takaragi et al. |
| 5,355,413 A | 10/1994 | Ohno |
| 5,361,062 A | 11/1994 | Weiss et al. |
| 5,367,572 A | 11/1994 | Weiss |
| 5,475,758 A | 12/1995 | Kikuchi |
| 5,475,826 A | 12/1995 | Fischer |
| 5,481,611 A | 1/1996 | Owens et al. |
| 5,495,533 A | 2/1996 | Linehan et al. |
| 5,638,448 A | 6/1997 | Nguyen |
| 5,757,924 A | 5/1998 | Friedman et al. |
| 5,796,830 A | 8/1998 | Johnson et al. |
| 5,953,420 A | 9/1999 | Matyas, Jr. et al. |
| 5,963,646 A | 10/1999 | Fielder et al. |
| 5,963,696 A | 10/1999 | Yoshida et al. |
| 5,966,441 A | 10/1999 | Calamera |
| 5,974,550 A | 10/1999 | Maliszewski |
| 5,995,624 A | 11/1999 | Fielder et al. |
| 6,049,612 A | 4/2000 | Fielder et al. |
| 6,105,133 A | 8/2000 | Fielder et al. |
| 6,345,101 B1 | 2/2002 | Shukla |
| 6,490,353 B1 | 12/2002 | Tan |
| 6,587,563 B1 | 7/2003 | Crandall |
| 6,769,060 B1 | 7/2004 | Dent et al. |
| 6,947,556 B1 | 9/2005 | Matyas, Jr. et al. |
| 6,987,853 B2 | 1/2006 | Uner |
| 7,032,240 B1 | 4/2006 | Cronce et al. |
| 7,095,855 B1 | 8/2006 | Collins |
| 2002/0143872 A1 | 10/2002 | Weiss et al. |
| 2002/0191796 A1 | 12/2002 | Muschenborn |
| 2004/0025028 A1 | 2/2004 | Takeuchi |
| 2004/0179684 A1 | 9/2004 | Appenzeller et al. |
| 2004/0230800 A1 | 11/2004 | Futa et al. |
| 2005/0039030 A1 | 2/2005 | Rodgers et al. |
| 2005/0063352 A1 | 3/2005 | Amara et al. |
| 2005/0076061 A1 | 4/2005 | Cox |
| 2006/0112418 A1 | 5/2006 | Bantz et al. |
| 2006/0174349 A1 | 8/2006 | Cronce et al. |
| 2007/0255941 A1 | 11/2007 | Ellis |
| 2007/0258584 A1 | 11/2007 | Brown et al. |
| 2008/0065880 A1 | 3/2008 | Martin et al. |
| 2010/0070778 A1 | 3/2010 | Murray et al. |

FOREIGN PATENT DOCUMENTS

| | | | |
|---|---|---|---|
| EP | 1906587 A2 | 4/2008 |
| GB | 2421407 A | 6/2006 |
| WO | 9847258 A2 | 10/1998 |
| WO | 03077469 A1 | 9/2003 |
| WO | 2004092864 A2 | 10/2004 |
| WO | 2007005909 A2 | 1/2007 |
| WO | 2008061848 A2 | 5/2008 |

OTHER PUBLICATIONS

International Search Report and the Written Opinion issued in PCT/US2010/028582; Dated: Jul. 30, 2010; (21 pages).

Schneider, B., "Security Pitfalls in Cryptography", Counterpane Systems, www.counterpane.com/publish.html, 1998, (11 pages).

Schneier, B., "Why Cryptography is Harder Than it Looks", Counterpane Systems, www.counterpane.com/publish.html, 1997, (8 pages).

Schneier, B., "Cryptographic Design Vulnerabilities", Counterpane Systems, www.counterpane.com/publish.html, Sep. 1998, (5 pages).

Bellare, Mihir Rogaway, Phillip, "Entity Authentication and Key Distribution," Advances in Crypto 1993 Proceedings, Springer-Verlag (Aug. 1993).

Bird, R. et al, "The KryptoKnight Family of Light-Weight Protocols for Authentication and Key Distribution," IEEE/ACM Transactions on Networking, vol. 3, No. 1, pp. 31-41, IEEE Press, Piscataway, NJ, Feb. 1995.

Damgard, I.B., "A Design Principle for Hash Functions,", Springer-Verlag, New York, 1998.

Gong, L., "Using One-Way Functions for Authentication," ACM Sigcom Computer Communication Review, vol. 19, Issue 5, pp. 8-11, New York, 1989.

Krawczyk, H., "SKEME: A Versatile Secure Key Exchange Mechanism for Internet," Proceedings of the 1996 Sympoium on Network and Distributed System Security (SNDSS) '96, pp. 114-127, IEEE Computer Society, Washington, DC (1996).

Leighton, T. and Micali, Silvio, "Secret Key Agreement without Public-Key Cryptography", Springer-Verlag, New York, 1998.

Matyas, S.M. & Meyer, C.H., "Generation, Distribution, and Installation of Cryptograpic Keys," 17 IBM Sys. J. 2 (1978).

Merkle, R., "One Way Hash functions and DES," In In G. Brassard, editor, Advances in Cryptology: Proceedings of Crypto'89, vol. 435 of Lecture Notes in Computer Science, pp. 428-446, Springer-Verlag, New York, 1990.

Molva, Reflik et al., "KryptoKnight Authentication and Key Distibution System," Computer Security-ESORICS 92 (Nov. 23-25, 1992).

Menezes, Alfred J. et al., Handbook of Applied Cryptography, CRC Press, Oct. 16, 1996.

Preneel, B., "MDx-MAC and Building Fast MACs from Hash Functions," Lecture Notes in Computer Science; vol. 963, Proceedings of the 15th Annual International Cryptology Conference on Advances in Cryptology, pp. 1-14, Springer-Verlag, London, UK (1995).

Schneier, Bruce, Applied Cryptography, Katherine Schowalter, 1996 (and first edition (1994) of same).

Freier, A. et al.,"SSL Version 3.0,"Netscape Communications Corporation, Dec. 1995.

RSA Laboratories, "PKCS #5: Password-Based Encryption Standard," version 1.5, Nov. 1993.

Rivest, R., "The MD5 Message-Digest Algorithm," IETF RFC 1321, Apr. 1992.

Berson, Thomas A., "Differential Cryptanalysis Mod 232 with Applications to MD5". EUROCRYPT. (1992).

Bert den Boer, Antoon Bosselaers (1993). Collisions for the Compression Function of MD5. Berlin; London: Soringer. ISBN 3-540-57600-2.

Kelsey, John et al., "Passphrase FAQ," alt.security.pgp, Oct. 1993.

"Windows '95 Vulnerabilities", US Department of Energy, Computer Incident Advisory Committee, available at http://ftp.cerias.purdue.edu/pub/lists/academic-firewalls/academic-firewalls.951224 (1995).

Carl Meyer and S.M. Matyas, Cryptography: A New Dimension in Computer Data Security (1982).

Hans Dobbertin, Cryptanalysis of MD5 Compress, May 2, 1996.

Hans Dobbertin, "The Status of MD5 After a Recent Attack", RSA Laboratories; CryptoBytes, 1996.

U.S. Department of Commerce, National Institute of Standards and Technology, "Secure Hash Standard", FIPS PUB 180-1, Apr. 17, 1995. (24 pages).

International Preliminary Report on Patentability and the Written Opinion issued in PCT/US2010/028562; Dated: Oct. 6, 2011; (22 pages).

International Preliminary Report on Patentability and the Written Opinion issued in PCT/US2010/028565 Dated: Oct. 6, 2011; (23 pages).

International Preliminary Report on Patentability and the Written Opinion issued in PCT/US2010/028582; Dated: Oct. 6, 2011; (15 pages).

International Preliminary Report on Patentability and the Written Opinion issued in PCT/US2010/028583; Dated: Oct. 6, 2011; (16 pages).

International Preliminary Report on Patentability and the Written Opinion issued in PCT/US2010/028566; Dated: Oct. 6, 2011; (14 pages).

International Search Report and the Written Opinion issued in PCT/US2010/028566; Dated: Dec. 30, 2010; (17 pages).

(56) References Cited

OTHER PUBLICATIONS

International Search Report and the Written Opinion issued in PCT/US2010/028565; Dated: Oct. 6, 2010; (31 pages).
International Search Report and the Written Opinion issued in PCT/US2010/028562; Dated: Sep. 29, 2010; (31 pages).
Barrett, Daniel and Sliverman, Richard, "SSH, The Secure Shell: The Definitive Guide, 2nd Edition", O'Reilly Media, Section 2.4, Section 3.3, Section 3.4, Section 6.1-6.7. May 1, 2005.
Ehrsam, W.F. et al., A Cryptographic Key Management Scheme for Implementing the Data Encryption Standard, IBM Sys. J., vol. 17 No. 2, 1978.
Cheng, P. et al., Modular Key Management Protocol (MKMP), Nov. 28, 1994.
RSA Laboratories, PKCS #5 v2.0: PAssword-Based Cryptography Standard, Mar. 25, 1999.
M. Fischer v. Mollard et al.; "Gnu Privacy Guard (GnuPG) Mini Howto"; retrieved from the Internet: http://www.gnupg.org/documentation/howtos.en.html, version 0.1.4; Aug. 10, 2004 (14 pages).

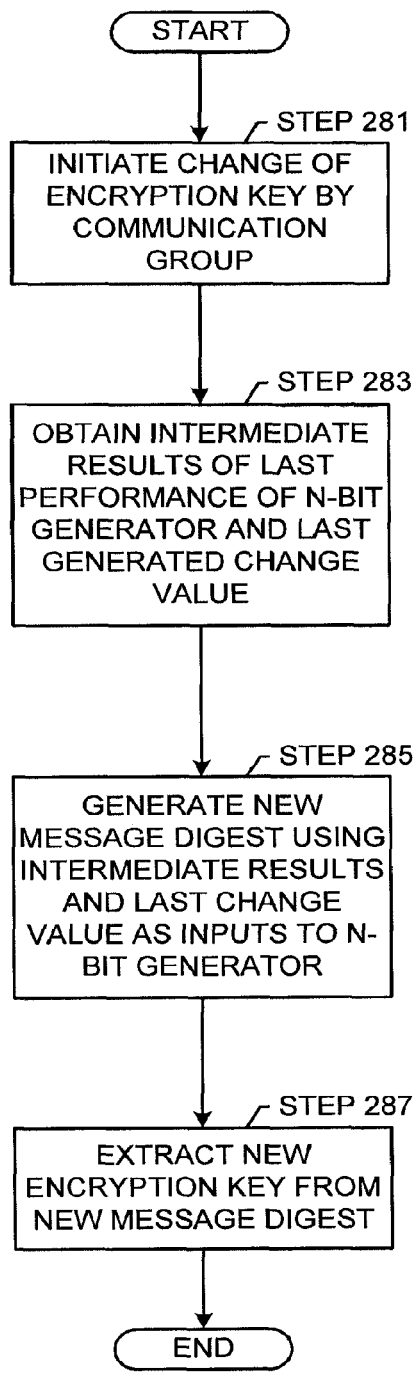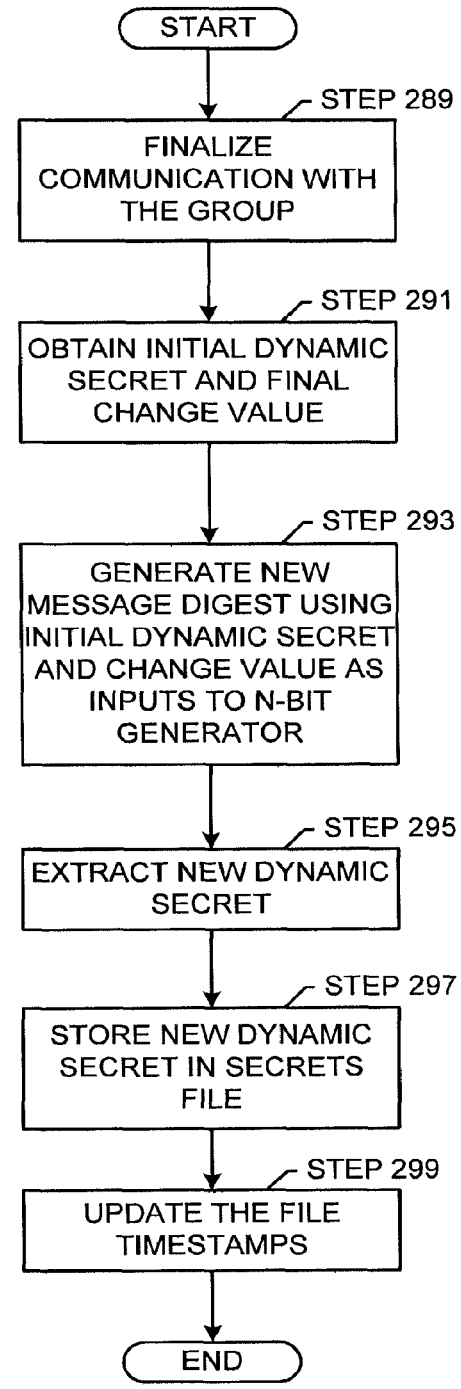
FIG. 5A                    FIG. 5B

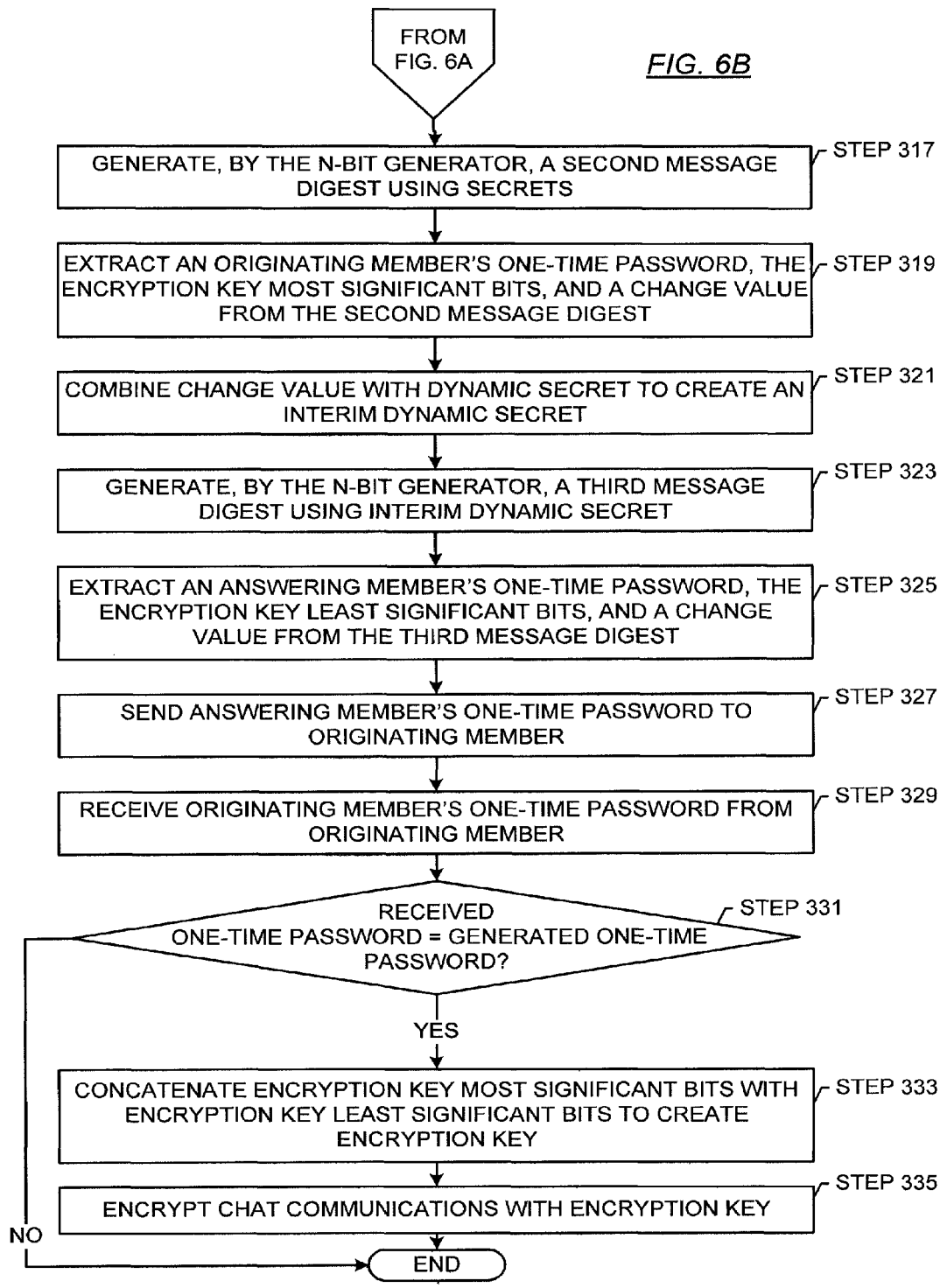

350
EXAMPLE SECOND MESSAGE DIGEST

| 352 ORIGINATING MEMBER ONE TIME PASSWORD | 354 DISCARD BITS | 356 SESSION ENCRYPTION KEY MOST SIGNIFICANT BITS (MSB) | 358 CHANGE VALUE |
|---|---|---|---|

*FIG. 6C*

360
EXAMPLE THIRD MESSAGE DIGEST

| 362 ANSWERING MEMBER ONE TIME PASSWORD | 364 DISCARD BITS | 366 SESSION ENCRYPTION KEY LEAST SIGNIFICANT BITS (LSB) | 368 CHANGE VALUE |
|---|---|---|---|

*FIG. 6D*

SYSTEM AND METHOD FOR PROTECTING SECRETS FILE

CROSS-REFERENCE TO RELATED APPLICATIONS

The present application claims benefit under 35 U.S.C. 120 as a continuation of U.S. patent application Ser. No. 13/203,327, filed on Aug. 25, 2011, entitled, "SYSTEM AND METHOD FOR PROTECTING A SECRETS FILE," and incorporated herein by reference. U.S. patent application Ser. No. 13/203,327 claims priority to PCT Application No. PCT/US10/28562 filed on Mar. 25, 2010, entitled, "SYSTEM AND METHOD FOR PROTECTING A SECRETS FILE," and incorporated herein by reference. PCT Application No. PCT/US10/28562 claims priority to U.S. Provisional Application No. 61/163,406 filed on Mar. 25, 2009 and entitled, "Method and System for Protecting Secrets Which Provides Security For Computers, Networks, and Information," and incorporated herein by reference.

BACKGROUND

The computer system assists in managing (e.g., storing, organizing, and communicating) a large amount of information. Some of the information managed by a computer system is confidential. In other words, access to such information is intended to be limited. Traditional protection schemes attempt to prevent unauthorized users from accessing the confidential information by requiring that a user provide authentication credential(s), for example a username and password, at a predefined entry point, to access an account that includes the confidential information. Protecting only the predefined entry points, however, fails to account for nefarious individuals creating other entry points by exploiting computer system vulnerabilities. For example, knowledge of a user's hardware and software system, system configuration, types of network connections, etc. may be used to create an entry point and gain access to the confidential information.

In order to prevent unauthorized access to the confidential information, the confidential information may be encrypted. Encryption is a process of transforming the clear text confidential information into an encrypted format that is unreadable by anyone or anything that does not possess a corresponding decryption key. An encryption algorithm and an encryption key are used to perform the transformation. Encryption technology is classified into two primary technology types: symmetric encryption technology and asymmetric encryption technology. Symmetric encryption technology uses the same encryption key to both encrypt and decrypt confidential information. Asymmetric encryption technology uses a pair of corresponding encryption keys: this key pair share a relationship such that data encrypted using one encryption key can only be decrypted using the other encryption key of the pair.

SUMMARY

In general, in one aspect, the invention relates to a method for protecting a first secrets file. The method includes an n-bit generator generating a secrets file name for the secrets file and generating a decoy file names for decoy files. The secrets file includes a secret. Each of the decoy files includes decoy file contents, are a same size as the secrets file, and is associated with a modification time within a range of modification times. The modification time of the secrets file is within the range of modification times. The secrets file and decoy files are stored in a secrets directory.

In general, in one aspect, the invention relates to a method for encrypting communication. The method includes receiving a request to communicate with a group, obtaining a group agreed connect name corresponding to the group, obtaining a username and password of a user of a member connecting to the group, and generating a first message digest using the group agreed connect name, the username, the password, and an n-bit generator. The method further includes extracting a secrets file name from the first message digest, obtaining an encrypted secrets file from a secrets directory, decrypting the encrypted secrets file to obtain a secrets file using a secrets file encryption key obtained from the first message digest, generating a second message digest using the n-bit generator and a first secret and a second secret from the secrets file, and encrypting communication between the member and the group using an encryption key obtained, at least in part, from the second message digest.

In general, in one aspect, the invention relates to a computing device for protecting a secrets file that includes a processor, a memory, and software instructions stored in memory. The software instructions cause the computing device to generate a secrets file name for the secrets file and generating a decoy file names for decoy files. The secrets file includes a secret. Each of the decoy files includes decoy file contents, are a same size as the secrets file, and is associated with a modification time within a range of modification times. The modification time of the secrets file is within the range of modification times. The secrets file and decoy files are stored in a secrets directory.

In general, in one aspect, the invention relates to a computing device for protecting a secrets file that includes a processor, a memory, and software instructions stored in memory. The software instructions cause the computing device to receive a request to communicate with a group, obtain a group agreed connect name corresponding to the group, obtain a username and password of a user of a member connecting to the group, and generate a first message digest using the group agreed connect name, the username, the password, and an n-bit generator. The software instructions further cause the computing device to extract a secrets file name from the first message digest, obtain an encrypted secrets file from a secrets directory, decrypt the encrypted secrets file to obtain a secrets file using a secrets file encryption key obtained from the first message digest, generate a second message digest using the n-bit generator and a first secret and a second secret from the secrets file, and encrypt communication between the member and the group using an encryption key obtained, at least in part, from the second message digest.

In general, in one aspect, the invention relates to a computer readable medium comprising computer readable program code embodied therein for causing a computer system to perform a method for protecting a first secrets file. The method includes an n-bit generator generating a secrets file name for the secrets file and generating a decoy file names for decoy files. The secrets file includes a secret. Each of the decoy files includes decoy file contents, are a same size as the secrets file, and is associated with a modification time within a range of modification times. The modification time of the secrets file is within the range of modification times. The secrets file and decoy files are stored in a secrets directory.

In general, in one aspect, the invention relates to a computer readable medium comprising computer readable program code embodied therein for causing a computer system to perform a method for protecting a first secrets file. The method includes receiving a request to communicate with a group, obtaining a group agreed connect name corresponding to the group, obtaining a username and password of a user of a member connecting to the group, and generating a first message digest using the group agreed connect name, the username, the password, and an n-bit generator. The method further includes extracting a secrets file name from the first message digest, obtaining an encrypted secrets file from a secrets directory, decrypting the encrypted secrets file to obtain a secrets file using a secrets file encryption key obtained from the first message digest, generating a second message digest using the n-bit generator and a first secret and a second secret from the secrets file, and encrypting communication between the member and the group using an encryption key obtained, at least in part, from the second message digest.

Other aspects of the invention will be apparent from the following description and the appended claims.

BRIEF DESCRIPTION OF DRAWINGS

FIGS. 2A-5B show flowcharts in accordance with one or more embodiments of the invention.

FIGS. 6A-7E show examples in accordance with one or more embodiments of the invention.

DETAILED DESCRIPTION

Figure 1:
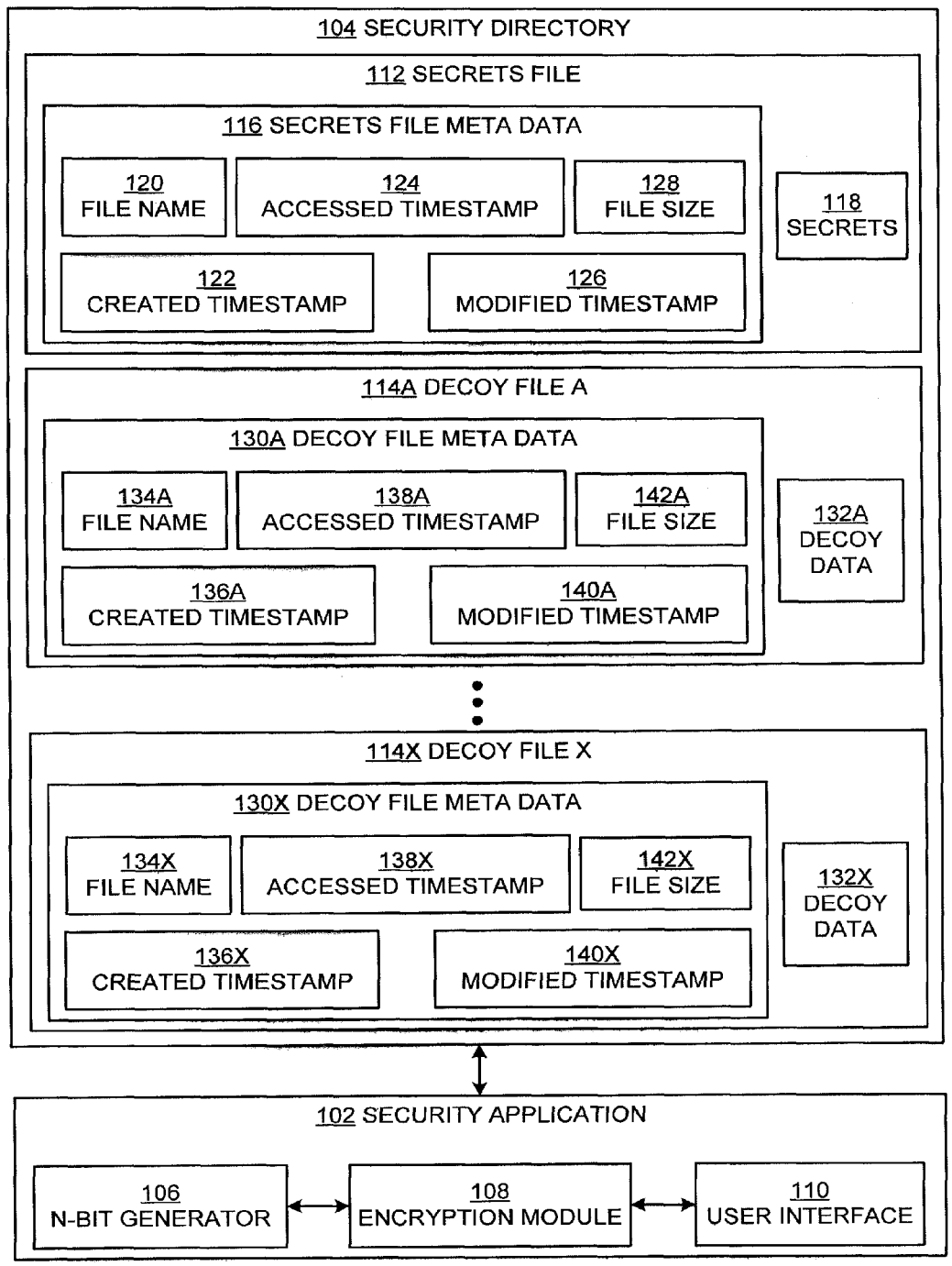
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to securing communication between members of a group, where each member is a computing device. In one or more embodiments of the invention, the group is two or more members that share (or intend to share) confidential information. The confidential information may be transmitted as communication (or portion thereof). Examples of communications include, but are not limited to, short messaging service (SMS) messages, electronic mail (e-mail), chat messages, audio messages, graphics, audio-visual messages (e.g., video file, streaming video, etc.). As used herein, a communication is encrypted when at least a portion of the communication is encrypted.

In one embodiment of the invention, a computing device is any physical or virtual device that may be used to perform embodiments of the invention. The physical device may correspond to any physical system with functionality to implement one or more embodiments of the invention. For example, the physical device may be implemented on a general purpose computing device (i.e., a device with a processor(s) and an operating system) such as, but not limited to, a desktop computer, a laptop computer, a gaming console, a mobile device (e.g., smart phone, a personal digital assistant, gaming device).

Alternatively, the physical device may be a special purpose computing device that includes an application-specific processor(s)/hardware configured to only execute embodiments of the invention. In such cases, the physical device may implement embodiments of the invention in hardware as a family of circuits and limited functionality to receive input and generate output in accordance with various embodiments of the invention. In addition, such computing devices may use a state-machine to implement various embodiments of the invention.

In another embodiment of the invention, the physical device may correspond to a computing device that include both a general purposes processor(s) and an application-specific processor(s)/hardware. In such cases, one or more portions of the invention may be implemented using the operating system and general purpose processor(s) and one or more portions of the invention may be implemented using the application-specific processor(s)/hardware.

The virtual device may correspond to a virtual machine. Broadly speaking, the virtual machines are distinct operating environments configured to inherit underlying functionality of the host operating system (and access to the underlying host hardware) via an abstraction layer. In one or more embodiments of the invention, a virtual machine includes a separate instance of an operating system, which is distinct from the host operating system. For example, one or more embodiments of the invention may be implemented on VMware® architectures involving: (i) one or more virtual machines executing on a host computer system such that each virtual machine serves as host to an instance of a guest operating system; and (ii) a hypervisor layer serving to facilitate intra-host communication between the one or more virtual machines and host computer system hardware. Alternatively, one or more embodiments of the invention may be implemented on Xen® architectures involving: (i) a control host operating system (e.g., Dom 0) including a hypervisor; and (ii) one or more VMs (e.g., Dom U) executing guest operating system instances. The invention is not limited to the aforementioned exemplary architectures VMware® is a registered trademark of VMware, Inc. Xen® is a trademark overseen by the Xen Project Advisory Board.

Each of the members may be used by, for example, an individual, a business entity, a family, any other entity, or any combination thereof. For example, a group may have members John Smith's computing device and Jane Doe's computing device. As another example, a group may have members John Smith's smart phone, John Smith's personal computer, and John Smith's gaming console. As another example, a group may have members John Smith's computing device, Jane Smith's computing device, and the servers of the Smith's financial advisors. Other possible groups may exist without departing from the scope of the invention.

In one or more embodiments of the invention, each member creates a secrets file that has secret(s). The name of the secrets file and the secret is generated by an n-bit generator. The secret(s) is used to secure communications between the members of the group. The n-bit generator also generates decoy file names and decoy file contents for decoy files. The decoy files and the secrets file are stored together in the same secrets directory. Thus, the secrets file is indistinguishable from the decoy files. Whenever the secrets file is updated, each of the decoy files are also updated such that the secrets file remains indistinguishable from the decoy files.

FIG. 1 shows a schematic diagram of a system in accordance with one or more embodiments of the invention. As shown in FIG. 1, the system includes a security application (102) and a security directory (104). Both of these components are discussed below.

In one or more embodiments of the invention, each member includes a security application (102). The security application (102) on each member may be instances of the same application, different versions of the same application, or different applications. Further, the security application may correspond to a complete program product or a programming module of another application. For example, the security application may be a part of and provide security for banking and/or commerce applications. In one or more embodiments of the invention, the security application (102) includes an n-bit generator (106), an encryption module (108), and a user interface (110). Each of the components of the security application (102) may be implemented in hardware, software, firmware, or a combination thereof. The components of the security application are discussed below.

In one or more embodiments of the invention, an n-bit generator (106) includes functionality to receive and process one or more inputs to generate a message digest. A message digest is a string of characters, which may be represented as a bit-string, in accordance with one or more embodiments of the invention. In one or more embodiments of the invention, the message digest is a bit string. Further, the n-bit generator includes functionality to generate a deterministic and repeatable message digest, which appears pseudo-random or random, in accordance with one or more embodiments of the invention. A pseudo-random output (e.g., message digest) is output that is repeatable and predictable but appears random. Specifically, in one or more embodiments of the invention, although the message digest is repeatable and calculable when the inputs and the operations performed by the n-bit generator (106) are known, the message digest appears random. The apparent randomness may be with respect to someone who knows or does not know the inputs in accordance with one or more embodiments of the invention. Alternatively, or additionally, the apparent randomness may be with respect to someone who does not know the operations performed by the n-bit generator in accordance with one or more embodiments of the invention. In one or more embodiments of the invention, the message digest is deterministic in that a single output exists for a given set of inputs. Moreover, the message digest may be a fixed length. In other words, regardless of the input length, the same n-bit generator (106) may produce a message digest with a fixed length.

The number of bits in the input to the n-bit generator may be different or the same as the number of bits in the output produced by the n-bit generator. For example, if the n-bit generator accepts n number of bits for input and produces m number of bits for output, m may be less than, equal to, or greater than n. Multiple iterations of the n-bit generator may be performed to construct an ever-increasing m-bit result that includes multiple message digests.

Further, the n-bit generator (106) includes functionality to generate a deterministic message digest. Specifically, the n-bit generator (106) has the following two properties. First, the n-bit generator (106) generates the same message digest when provided with the same input(s). Second, the n-bit generator generates, with a high probability, a different message digest when provided with different input(s). For example, a single bit change in the input may result in a significant change of the bits in the resulting message digest. In the example, the change may be fifty percent of the bits depending on the type of n-bit generator used. However, a greater percentage or less percentage of bits may change without departing from the scope of the invention.

The n-bit generator (106) may include multiple sub-routines, such as a bit shuffler (not shown) and a hash function (not shown). In one or more embodiments of the invention, the bit shuffler includes functionality to combine multiple inputs into a single output. Specifically, the bit shuffler applies a function to the bit level representation of inputs to generate a resulting set of output bits. The output of the bit shuffler may appear as a shuffling of bits in each of inputs and may or may not have the same ratio of 1's to 0's as the input. In one or more embodiments of the invention, the bit shuffling by the bit shuffler has a commutative property. In other words, the order that inputs are provided to the bit shuffler does not affect the output. For example, consider the scenario in which the inputs are input X, input Y, and input Z. Bit shuffling on input X, input Y, and input Z produces the same output as bit shuffling on input Y, input Z, and input X.

In one embodiment of the invention, the bit shuffler may correspond to any function or series of functions for combining inputs. For example, the bit shuffler may correspond to the XOR function, the multiplication function, an addition function, or another function that may be used to combine inputs. As another example, the security application with the bit shuffler may correspond to a function that orders the inputs and then uses a non-commutative function to generate an output. The bit shuffler may correspond to other mechanisms for combining multiple inputs without departing from the scope of the invention.

In one or more embodiments of the invention, a hash function is a function that includes functionality to receive an input and produce a pseudo-random output. In one or more embodiments of the invention, the hash function may include functionality to convert a variable length input into a fixed length output. For example, the hash function may correspond to GOST, HAVAL, MD2, MD4, MD5, PANAMA, SNEERU, a member of the RIPEMD family of hash functions, a member of the SHA family of hash functions, Tiger, Whirlpool, S-Box, P-Box, any other hash function, or combination thereof.

Although the above description discusses the use of the bit shuffler prior to the hash function, in one or more embodiments of the invention, the hash function operations may be performed prior to the bit shuffler operations. For example, the hash function may be performed separately on each of the inputs to create hashed inputs. The hashed inputs may then be combined by the bit shuffler. Alternatively, the bit shuffler may be first performed on the inputs to create a single intermediate result before the intermediate result is provided to the hash function. The intermediate result may be stored to be used later to create subsequent message digests.

Further, in one or more embodiments of the invention, the n-bit generator includes a random character generator, such as a random number generator. The random character generator includes functionality to generate a random string of characters of a specified length. The n-bit generator may use the random character generator, for example, to generate the decoy file names (e.g., 134A, 134X) and/or the decoy data (e.g., 132A, 132X).

The n-bit generator (106) is operatively connected to an encryption module (108) in accordance with one or more embodiments of the invention. An encryption module (108) includes functionality to manage the encryption and decryption of information for the computing device. Specifically, the encryption module (108) includes functionality to request generation of a secrets file (112) (discussed below) and decoy files (e.g., 114A, 114X) (discussed below). The encryption module (108) may further include functionality to update files in the security directory (104) (discussed below) so that all files in the secrets directory (104) appear indistinguishable from each other.

For example, the encryption module may include functionality to receive information, request one or more message digests from the n-bit generator (106), extract an encryption key from the one or more message digests, and/or encrypt the information using the encryption key. Alternatively, or additionally, the encryption module (108) may include functionality to receive encrypted information, request one or more message digests from the n-bit generator (106), extract an encryption key from the one or more message digests, and/or decrypt the encrypted information using the encryption key.

In one or more embodiments of the invention, the encryption module (108) is identically configured across all members of a group to request the same number of message digests. The configuration may be based, for example, on the type of communication, the encryption algorithm, and/or the type of data to be extracted from the message digest.

The encryption module (108) implements one or more encryption algorithms. In one or more embodiments of the invention, the encryption algorithm includes functionality to transform information in a clear text format into an encrypted format that is unreadable by anyone or anything that does not possess a corresponding encryption key. For example, the encryption algorithm may correspond to Data Encryption Algorithm (DEA) specified in the Data Encryption Standard (DES), Triple DES, Advanced Encryption Standard (AES), FEAL, SKIPJACK, any other encryption algorithm, or any combination thereof. In one or more embodiments of the invention, the encryption module implements only symmetric encryption algorithm(s).

Although not shown in FIG. 1, the encryption module (108) may also include or be operatively connected to an algorithm selector table (not shown). An algorithm selector table is a logical association between encryption algorithms and an algorithm identifier. The algorithm identifier may be, for example, a numeric, binary, or another such value. In one or more embodiments of the invention, all algorithm identifiers in a range are present. For example, the algorithm identifier may be a range of integers (e.g., 0 . . . 15), a sequence of binary values (e.g., 000, 001, 010, . . . 111). Further, the same encryption algorithm may be associated with multiple algorithm identifiers in the table. For example, "0" may correspond to AES, "1" may correspond to Triple DES, "2" may correspond FEAL, and "3" may correspond to Triple DES. The use of the term, "table", is only to denote a logical representation, various data structures may be used to implement the algorithm selector table without departing from the scope of the invention.

Further, in one or more embodiments of the invention, the association between the encryption algorithm identifiers and the encryption algorithms is not based on a pre-defined ordering of encryption algorithms. Specifically, the association may be randomly defined.

The use of the term, "table", is only to denote a logical representation; various implementations of the algorithm selector table may be used without departing from the scope of the invention. For example, the algorithm selector table may be implemented in computer instructions using a series of conditional statements. Specifically, when a conditional statement is satisfied, the code corresponding to the implementation of the encryption algorithm is executed. By way of another example, the algorithm selector table may be implemented as a data structure that associates the consecutive encryption algorithm identifiers with identifiers used by the security application for each of the encryption algorithms.

The above are only a few examples of possible implementations for the algorithm selector table and not intended to limit the scope of the invention.

Further, all members associate the same encryption algorithm identifiers with the same corresponding encryption algorithms. For example, if one member associates "0" with AES, "1" with Triple DES, "2" with FEAL, and "3" with Triple DES, then the remaining members associates "0" with AES, "1" with Triple DES, "2" with FEAL, and "3" with Triple DES. Further, all members may or may not use the same implementation of the algorithm selector table.

In one or more embodiments of the invention, the algorithm selector table includes separate entries for each encryption algorithm and key length pair. In one or more embodiments of the invention, the encryption module may identify the encryption algorithm from the algorithm selector table and use the key length associated with the encryption algorithm to extract the appropriate number of bits for the encryption key. For example, an entry may exist for Blowfish with an encryption key length 256 bits and a separate entry may exist for Blowfish with an encryption key length of 384 bits. In the example, if the first entry is specified in the algorithm selector bits of the message digest (discussed below), then 256 bits are extracted from the message digest(s) for the encryption key. Alternatively, in the example, if the second entry is specified, then 384 bits are extracted from the message digest for the encryption key.

Further, each entry in the algorithm selector table may include a starting bit value. The starting bit value may be used to identify a first secret to use in the secrets repository or a starting bit for the encryption key in the message digest.

Alternatively, although not shown in FIG. 1, the system may include a key length table. The key length table may specify an identifier with a corresponding encryption key length. Similar to the algorithm selector table, multiple different possible implementations of the key length table may be used without departing from the scope of the invention. Further, all members of the group have the associations between key length identifiers and key lengths, but may not have the same implementation of key length table. For example, "1" may be associated with "256 bits", 2 may be associated with "128 bits", etc.

In one or more embodiment of the invention, when a key length table is used, the algorithm selector table may be used to specify the encryption algorithm, and the key length table may be used to specify the number of bits in the encryption key. Specifically, a key length field (discussed below) in the message digest may index the corresponding entry in the key length table. In one or more embodiments of the invention, if the specified encryption algorithm does not allow for variable key length, then the key length field in the message digest is ignored.

Continuing with the security application (102), in one or more embodiments of the invention, the user interface (110) includes functionality to communicate with a user of the computing device. For example, the user interface (110) may include functionality to guide a user through configuring the security application to communicate with one or more groups of which the computing device is a member. Further, the user interface (110) may include functionality to inform a user when another member of a group is requesting communication and provide the user with the option of allowing the communication with the user's computing device. The user interface (110) may include hardware and/or software components, such as information boxes, menu buttons, drop down boxes, input boxes, hardware lights, hardware buttons, and/or other user interface components.

Although not shown in FIG. 1, the security application may include an application programming interface (API). The security application may be configured to communicate with other applications executing on the same or different computing devices using the API. Thus, for example, the API of member A may include functionality to communicate via the network with member B's security application. As another example, the API may include functionality to receive an encrypted format of a file and provide a clear text format of the file to another application executing on member A. Conversely, the API may include functionality to receive, from another application on member A, a clear text format of a file and provide an encrypted format of the file to another application executing on member A on member B.

In one or more embodiments of the invention, the security application (102) includes functionality to access and use a security directory (104). A security directory (104) is located within a file system for storage of the secrets file (112) and the decoy files (e.g., 114A, 114X). Alternatively, the file system merely includes an access point for the security directory, which is stored on an external physical storage medium that is accessible via the file system (e.g., the external physical storage medium is mounted to the file system). In one or more embodiments of the invention, the security directory (104) does not include any partitioning (e.g., in the form of subdirectories or subfolders) of the secrets file (112) and the decoy files (e.g., 114A, 114X). Further, in one or more embodiments of the invention, secrets files (112) and decoy files (e.g., 114A, 114X) generated for different groups of users are not partitioned in the security directory (104). Alternatively, the security directory (104) may include a partitioning of files for each group of which the user is a member.

In one embodiment of the invention, the secrets directory (104) (or portions thereof) is located on an external device that is accessible to the security application. Examples of external devices include, but are not limited to, a mobile phone, a smart phone, a personal digital assistant, a portable gaming device, a memory device (e.g., any device with non-volatile memory) with a contactless interface (e.g., a BlueTooth Interface), a memory device (e.g., any device with non-volatile memory) with a contact interface (e.g., a Universal Serial Bus (USB) interface), etc.

Although FIG. 1 shows the security directory (104) as only including the secrets file (112) and the decoy files (e.g., 114A, 114X), the security directory (104) may include other files without departing from the scope of the invention. For example, the security directory (104) may include general files for the member, general files for a computer system (not shown) connected to the member, configuration files for the security application (102), and/or any other files. Further, the other files may or may not be in the same partition in the security directory as the secrets file (112) and the decoy files (e.g., 114A, 114X).

The secrets file (112) is a file for storing secrets (118). Secrets in the secrets file (112) are shared secrets. Shared secrets (118) correspond to data known only to the members of the group. Specifically, the security application (102) of each member of the group independently generates the secrets (118) using an n-bit generator (106) and the same group agreed seed as inputs to the n-bit generator (106). The group agreed seed may be any password, passphrase, or series of characters agreed upon by members of the group or their corresponding users. For example, the group agreed seed may be "the cow jumped over the moon," "#8$# DsaVA (@12w@," or any other collection of characters (e.g., symbols and/or alphanumeric characters).

In one or more embodiments of the invention, because each secret is generated by the n-bit generator (106), each secret is pseudo-random. For example, when interpreted in textual-based format, each secret appears as random string of characters (e.g., ASCII symbols or any other character set used to represent characters).

In one or more embodiments of the invention, each security application generates the same set of secrets (118). Each secret (118) in the secrets file may be associated with a unique secret identifier. The unique secret identifier may be a consecutive integer specifying when the secret was generated. For example, the first generated secret may be associated with the number one, while the second generated may be associated with the number two, etc. The consecutive integer may be explicitly or implicitly associated with the secret. For example, the number one may be stored in the secrets file (112) with the first generated secret. Alternatively, the first generated secret may be in the first position in the secrets file to indirectly associate the first generated secret with the first integer.

Secrets (118) in the secrets file (112) are each associated with a given group and may be further organized according to type of communication in accordance with one or more embodiments of the invention. For example, secrets used for encryption in a chat session may be different than secrets used for encryption in an email communication. Alternatively or additionally, the secrets may be organized based on the clear text file format of a file to be encrypted. For example, secrets used to encrypt portable document formatted (PDF) files may be different than secrets used to encrypt extensible markup language (XML) files.

In one or more embodiments of the invention, each shared secret may include a static secret, a dynamic secret, or both a static secret and a dynamic secret. The static secret may remain unchanged throughout the lifetime of the group in accordance with one or more embodiments of the invention. For example, the static secret may be used to recover secure communications by providing a new set of secrets when the members of the group lose synchronization with regards to the dynamic secrets. In contrast, the dynamic secret may periodically change, such as at the end of each communication session or prior to beginning a communication session.

In one or more embodiments of the invention, a communication session may be a set of related communications (e.g., related short messaging service messages (SMS), related emails, chat messages, or other related communications). Alternatively, or additionally, a communication session may correspond to a set of communications starting at a first time and having a duration of a pre-defined amount of time. The pre-defined amount of time may be defined, for example, according to the amount of time after the last communication is sent and/or received.

In one or more embodiments of the invention, secrets (118) are protected in the secrets file. The protection of the secrets (118) may be performed by encrypting the file. Specifically, the secrets file (112) may have an encryption key (not shown) associated with the secrets file (112), such that only the encryption module (108) can decrypt the file. Protection may further include making the secrets (118) inaccessible to the member having the secrets directory (104). Specifically, the member (or user of the member) may be unable to identify the secrets (118) or even the secrets file (112). By hiding the secrets (118) even from the member (and the user of the member) having the security application (102) and the security directory (104), the secrets (118) are highly unlikely to be compromised by the member (or the user of the member).

In addition to secrets (118), the secrets file (112) also include secrets file metadata (116). The secrets file metadata (116) includes information about the secrets file (112). As shown in FIG. 1, the secrets file metadata (116) may include a file name (120), a created timestamp (122), an accessed timestamp (124), a modified timestamp (126), and a file size (128).

The file name (120) is the unique identifier of the file within the security directory (104). In one or more embodiments of the invention, the file name appears randomly generated. Specifically, the file name (120) is a pseudo-random string of characters (e.g., symbols and/or alphanumeric characters) of a pre-defined length. The file name may be generated by the n-bit generator and may be converted to textual based format.

The created timestamp (122) specifies when the secrets file (112) was created. If the secrets file (112) is a copy of an original secrets file (112), then the created timestamp specifies when the copy was created. Similarly, the accessed timestamp specifies when the secrets file (112) was last accessed by the user or the program. For example, the accessed timestamp may correspond to the last time in which the secrets file (112) was opened. The modified timestamp (126) specifies when the secrets file (112) was last modified. Specifically, the modified timestamp (126) specifies when a change was saved to the secrets file (112). The file size (128) provides the size of the secrets file (112). Specifically, the file size (128) may specify, for example, the amount of physical storage space required to store the secrets file.

In addition to the secrets file (112), the security directory (104) also includes decoy files (e.g., 114A, 114X) in accordance with one or more embodiments of the invention. In one or more embodiments of the invention, the decoy files (e.g., 114A, 114X) are indistinguishable from the secrets file (112). Specifically, like the secrets file (112), the decoy files include metadata (e.g., 130A, 130X) [130X was omitted from FIG. 1] and data (e.g., 132A, 132X). The decoy file metadata (e.g., 130A, 130X) may include a file name (e.g., 134A, 134X), a created timestamp (e.g., 136A, 136X), accessed timestamp (e.g., 138A, 138X), modified timestamp (e.g., 140A, 140X), and file size (e.g., 142A, 142X).

In one or more embodiments of the invention, the file name (e.g., 134A, 134X) of the decoy files (e.g., 114A, 114X) are similar to the file name (120) of the secrets file (112). Specifically, like the secrets file name (120), the decoy file name (e.g., 134A, 134X) is a pseudo-random string of characters. Further, the decoy file name (e.g., 134A, 134X) includes only characters that may be present in the secrets file name (120). For example, if the secrets file name (120) includes only alphanumeric characters, then the decoy file names (e.g., 134A, 134X) also only include alphanumeric characters. Thus, the secrets file name (120) appears indistinguishable from the decoy file name (e.g., 114A, 114X).

Further, in one or more embodiments of the invention, the created timestamp (e.g., 136A, 136X), the accessed timestamp (e.g., 138A, 138X), the modified timestamp (e.g., 140A, 140X), and the file size (e.g., 142A, 142X) of the decoy files (e.g., 114A, 114X) are identical to created timestamp (122), accessed timestamp (124), modified timestamp (126), and the file size (128) of the secrets file (112). Rather than being completely identical, the aforementioned components may be substantially identical (e.g., have only a difference of a few seconds or millisecond). Moreover, the values of the aforementioned components of the secrets file (112) are within the range of values of the aforementioned components of the various decoy files (e.g., 114A, 114X). For example, if the modified timestamp of the secrets file is 10:21:45 AM on Aug. 1, 2010, the modified timestamp of the decoy files may range from 10:21:36 AM on Aug. 1, 2010 to 10:21:59 AM on Aug. 1, 2010. A broader range of timestamps may exist without departing from the scope of the invention.

Similar to the file name (e.g., 134A, 134X) of the decoy files (e.g., 114A, 114X) and the file name (120) of the secrets file (112), the decoy data (e.g., 132A, 132X) appear indistinguishable to the secrets (118). In particular, the decoy data (e.g., 132A, 132X) has the same apparent randomization of characters as the secrets. Further, if the secrets file is partitioned into secrets (e.g., static and dynamic secrets), then the decoy data is also partitioned into strings of the same number of characters as the secrets. Similarly, if the secrets file includes identifiers, then the decoy data also includes similar identifiers. Thus, the decoy data (e.g., 132A, 132X) includes the same amount, same identifier, same file structure and the same apparent randomization of characters as the secrets (118) in accordance with one or more embodiments of the invention. The decoy data (e.g., 132A, 132X) may be encrypted, for example, using the same encryption algorithm to encrypt the secrets (118).

Although FIG. 1 shows the secrets file (112) as the first file, the secrets file (112) may be intermingled between the decoy files (e.g., 114A, 114X). For example, the ordering of the files within the secrets directory does not account for fact that the secrets file is a secrets file. Thus, the secrets file (112) is not in a pre-defined position within the secrets directory.

Further, a portion of the security application (102) may be remote from the computing device. For example, a portion of the security application may be stored on an external storage device. As another example, an external device that is connected to the computing device may be configured to process and display a user interface for the security application (102) executing on the computing device.

Further, the metadata shown in FIG. 1 may be only a portion of the metadata (e.g., 116, 130A, 130X) that is manipulated to be identical or substantially identical for the secrets file (112) and the decoy files (e.g., 114A, 114X). Specifically, the secrets file (112) and the decoy files (e.g., 114A, 114X) may include additional metadata without departing from the scope of the invention. Further, the additional metadata may or may not be updated to be identical or substantially identical without departing from the scope of the invention. For example, if the metadata includes the file creator, then the secrets file and decoy files are forced to have the same file creator in accordance with one or more embodiments of the invention. In the example, the file creator may be the user or a pre-specified name.

FIGS. 2A-5B show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Further, in the following flowcharts, a member of the group is deemed to perform the actions when the security application of the member performs the actions on behalf of the member.

Figure 2A:
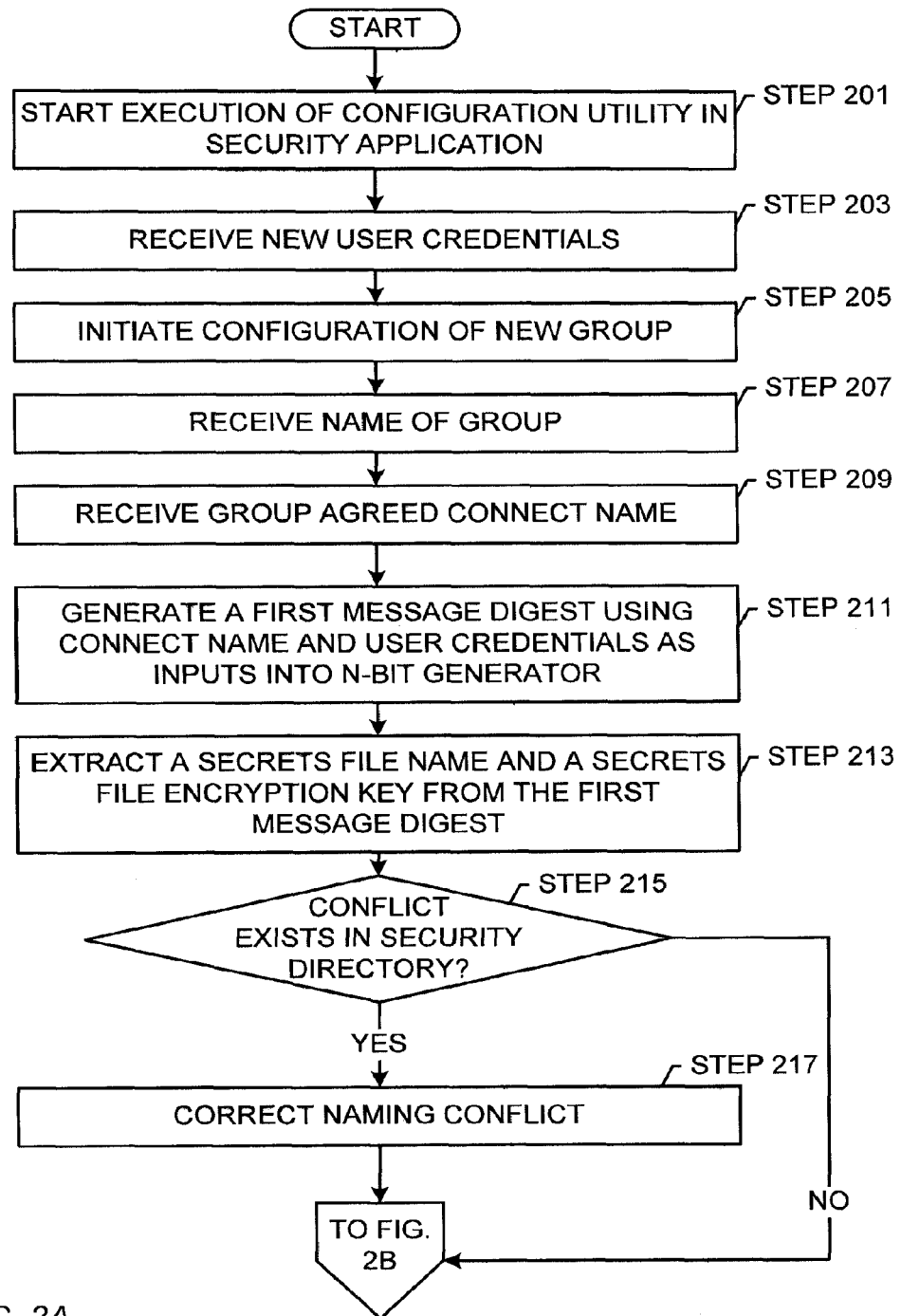
Figure 2B:
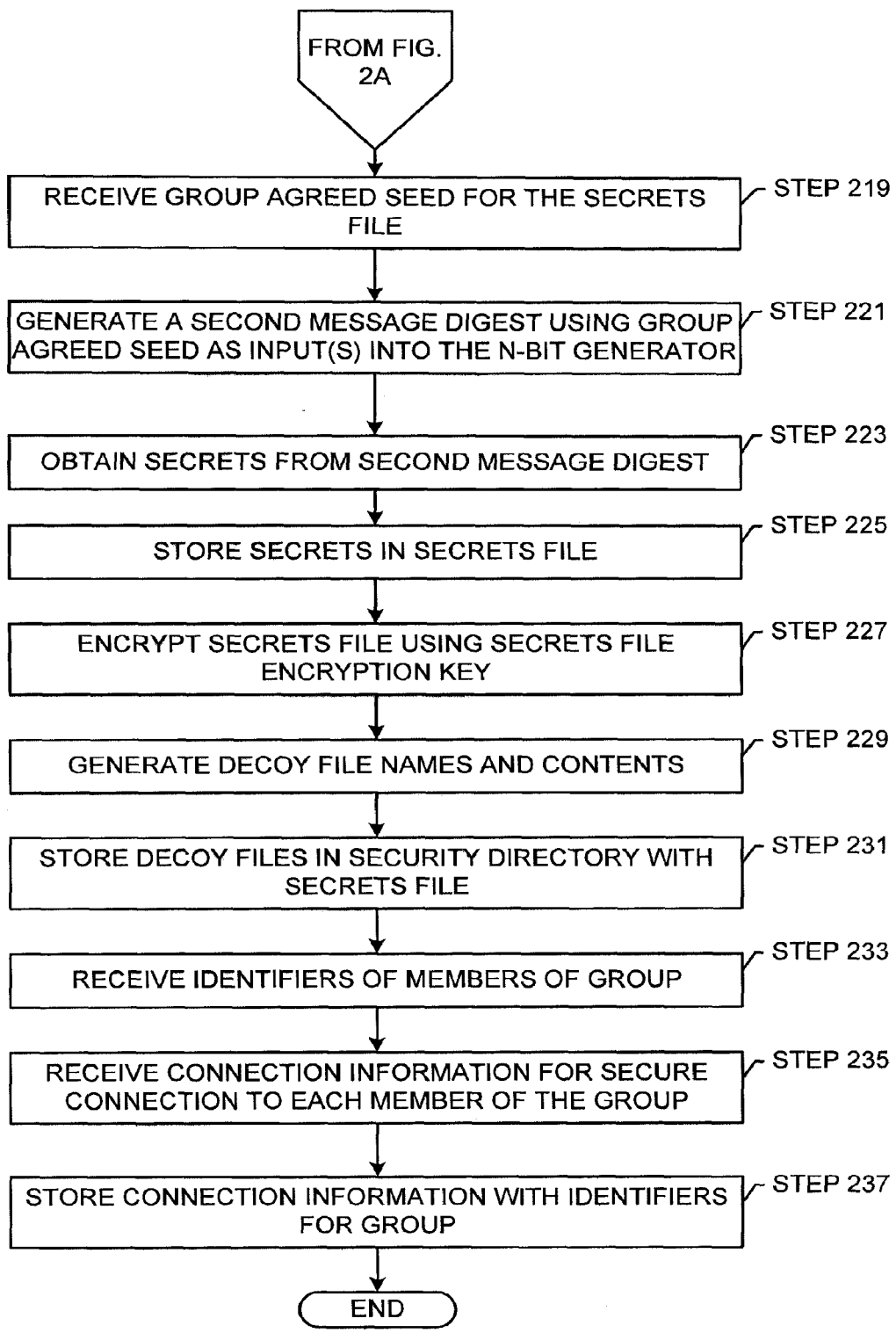

FIGS. 2A-2B show a flowchart for configuring the security application in accordance with one or more embodiments of the invention. As shown in FIG. 2A, in Step 201, execution of a configuration utility in the security application is started. In one or more embodiments of the invention, the first time that a user starts the security application, the configuration utility is started. Further, in one or more embodiments of the invention, the user may use the configuration utility after the first configuration, such as to add additional groups. As discussed below, the configuration utility may guide the user through configuring the security application to communicate with the groups of which the user's computing device is a member. Those skilled in the art will appreciate that a process executing on the computing device may initiate the configuration of the security instead of the user.

Continuing with FIG. 2A, in Step 203, the security application receives new user credentials. In one or more embodiments of the invention, the new user credentials may include, for example, a username and password. Other forms of user credentials may be used without departing from the scope of the invention. After the user provides the new user credentials, the user may be required later to use the provided credentials to use the security application.

Alternatively, rather than the user providing new user credentials in Step 203, the security application may be pre-configured with user credentials. For example, consider the scenario in which the security application is provided to the user by a business entity that pre-associates the security application with user credentials. In such a scenario, the user in Step 203 may be requested to provide the pre-associated credentials in order to configure the security application.

Continuing with FIG. 2A, in Step 205, a configuration of a new group is initiated. For example, a user may select a menu option or software button to indicate that the user would like to add a new group. Alternatively or additionally, the configuration may be based on the user receiving an invite via the security application. The user may be invited by other members to the group. For example, consider the scenario in which the user is an employee of a company. An administrator of the company may trigger the administrator's security application to send, to the employee's work computer, an invitation to join the group. Based on the invite, the security application on the employees work computer starts the configuration of the new group.

In Step 207, the name of the group is received. In one or more embodiments of the invention, the user provides a nickname for the group. The user may provide a name that the user is capable of remembering. For example, the name may be the names of the users who have computing devices that are members of the group. For example, if John's computing device, Angie's computing device, and Joe's computing device are members, then the group name may be John-Angie-Joe. Further, in one or more embodiments of the invention, the names are alphabetically ordered. For example, the group name may be Angie-Joe-John. Rather than using names associated with the members of the group, the group name may be a description of the group (e.g., "financial management team," "work group," "lawsuit strategy team," etc.).

In Step 209, a group agreed connect name for the new group is received. In one or more embodiments of the invention, a group agreed connect name is an identifier of the group used by all of the members. Specifically, each member of the group associates the same group agreed connect name with the group. Thus, whereas the name of the group in Step 207 may be a name used by a single member, the group agreed connect name is an identifier shared by all members. Further, the group agreed connect name may be an alphanumeric value which would be very difficult to memorize. Because all members associate the same group with the same group agreed connect name, the group agreed connect name may be used by a member of the group when triggering the start of a communication session with other members of the group. For example, consider the scenario in which group A includes Angie's computing device, Joe's computing device, and John's computing device, and has a connect name of 32. Group B includes only Joe's computing device and Angie's computing device, and has connect name 43. In the scenario, Joe's computing device may start communication with the Group A by using connect name 32. Thus, Angie's computing device uses the correct set of secrets for Group A.

The group may agree on a group agreed connect name by using a negotiation protocol. For example, one or more members may broadcast a proposed connect name, which is either accepted or rejected by the other group members. If all members agree, then the agreed proposed connect name may be a group agreed connect name. Alternatively, the group agreed connect name may be assigned. For example, an administrator of the group, who may or may not be a member, may assign the group agreed connect name to the group. As another example, users of the members may communicate the group agreed connect name in person, over the phone, via postal mail, or using any other alternative communication channel.

In Step 211, a first message digest is generated using the group agreed connect name and the user credentials as inputs into the n-bit generator. Specifically, the encryption module calls the n-bit generator using the group agreed connect name and the user credentials as the input values. The n-bit generator generates the first message digest by applying the operations of the n-bit generator (discussed above) to the input values.

In Step 213, a secrets file name and a secrets file encryption key is extracted from the first message digest. Specifically, the encryption module identifies each portion of the message digest corresponding to a secrets file name and a secrets file encryption key. For example, in a 512-bit message digest, bits in bit positions 0-255 may correspond to the secrets file name, bits in bit positions corresponding to 256-383 may correspond to the secrets file encryption key, and the final 128 bits may correspond to discard bits that remain unused. In the example, the security application extracts the secrets file name by obtaining 0-255 bits and extracts the secrets file encryption key by obtaining the next 128 bits. In one or more embodiments of the invention, because the user credentials are part of the input in Step 211, with a high probability, a different message digest is generated by each member of the group. Thus, the secrets file name and the secrets file encryption key are different for each member of the group. Thus, a nefarious individual or computer system cannot correlate file names on different members to identify the secrets file or decrypt an encrypted secrets file using a secrets file encryption key generated by another member.

In Step 215, a determination is made whether a file naming conflict exists in the security directory. Specifically, a determination is made whether the file name matches an existing file name in the security directory. If a file naming conflict exists, the naming conflict is corrected in Step 217. Different techniques may be used to correct the naming conflict. For example, the member having the naming conflict may request that a new group agreed connect name is used. The new group agreed connect name may be generated by incrementing or appending a value on the previous group agreed connect name or repeating Step 209. Other methods to correct the naming conflict may be used without departing from the scope of the invention.

Continuing with FIG. 2B, in Step 219, regardless of whether a naming conflict exists, a group agreed seed is received for the secrets file. Specifically, the members of the group and/or their corresponding users communicate and agree on a group agreed seed. If the users communicate and agree on the group agreed seed, then the user may submit the group agreed seed to the security application. In such embodiments, the security application obtains the group agreed seed from the member. If the members communicate with the other members regarding the group agreed seed, then the member obtains the group agreed seed as the one agreed upon. The group agreed seed may be any password, passphrase, or series of characters. For example, the group agreed seed may be "the cow jumped over the moon," "#8$# DsaVA(@ 12w@," or any other collection of characters (e.g., symbols and/or alphanumeric characters). Users of the members may communicate the group agreed seed in person, over the phone, via postal mail, or using any other alternative communication channel. Each member may independently submit the group agreed seed to the security application. When prompted, the user of each member may enter the group agreed seed in a field of the user interface of the security application.

In Step 221, a second message digest is generated using the group agreed seed as input into the n-bit generator. Specifically, the encryption module calls the n-bit generator using the group agreed seed as the input value. The n-bit generators of each of the members performs the same one or more functions for all of the members of the group. Thus, the same message digest (i.e., the second message digest) is generated by all members of the group.

In Step 223, secrets are obtained from the second message digest. Specifically, the encryption module identifies each portion of the second message digest relating to a secret. The following examples are not intended to limit the scope of the invention. Turning to an example, in a 512-bit message digest, bits in bit positions 0-127 may correspond to the static secret, bits in bit position corresponding to 128-383 may correspond to the dynamic secret and the final 128 bits may correspond to discard bits that remain unused or to a change (increment) value to be included as an input to an iterative pass of the n-bit generator. In the example, the security application extracts the static secret by obtaining the first 128 bits of the message digest and extracts the dynamic secret by obtaining the next 256 bits. As discussed, the above is only an example. For example, the ordering of the static secrets, dynamic secret, and discard bits may be different from the previous example, the discard bits may be omitted, the static secret or a portion thereof may be in different message digests, the dynamic secret or a portion thereof may be in different message digests, or one of the secrets may be omitted. In one or more embodiments of the invention, each security application extracts the same bits for each of the secrets. Thus, each member of the group generates the same set of secrets.

As another example for extracting secrets, bits in the message digest may indicate the starting position of each of the secrets. For example, the first four bits low order or least significant of the message digest may be used as shift bits defining the start of a secret. In such an example, the first bit of a secret may start following the shift value. By way of an example, if the shift bits in the message digest is "0001" (or one in base 10), then the secret starts at bit position two. As another example, if the shift bits is "1000" (or eight in base 10), the secret starts a bit 9.

Additional secrets may be generated for the group by repeating Steps 221 and 223 using the second message digest (or a portion thereof) and subsequent message digests (or a portion thereof) as an input to the n-bit generator. Alternatively, or additionally, Steps 221 and 223 may be repeated multiple times to generate a succession of new secrets. For example, each subsequent time may use, as input, the message digest from the previously time. Alternatively or additionally, additional secrets may be generated by repeating Steps 203-205 in which new group agreed seeds are used.

In Step 225, the secrets are stored in the secrets file. As discussed above, each secret may be stored with the unique secret identifier and/or a secrets grouping identifier.

In Step 227, the secrets are encrypted using the secrets file encryption key (obtained in Step 213). Specifically, the encryption module applies an encryption algorithm to the secrets file using the secrets file encryption key. Thus, the secrets in the secrets file may be protected even if the secrets file is identified.

In Step 229, decoy file names and contents are generated for the decoy files. Different techniques may be used to create the decoy file names and contents. For example, the encryption module may request that the n-bit generator uses a random character generator to generate a random set of characters of an identical length as the secrets and secrets file name. As another example, the encryption module may call the n-bit generator with pseudo-randomly generated input to create the decoy files. As another example, the encryption module may use the final generated secret (e.g., secret(s) obtained in Step 223) with or without modification input as input to the n-bit generator to produce additional content.

In one or more embodiments of the invention, two or three decoy files are created each time a secrets file is created. More or fewer decoy files may be created without departing from the scope of the invention. Further, once the security directory has a threshold number of files (secrets file and decoy files), the encryption module may stop creating decoy files in one or more embodiments of the invention.

In Step 231, the decoy files are stored in the security directory with the secrets file. In one or more embodiments of the invention, the creation storage of the decoy files is the same time as the creation and storage of the encrypted secrets file. Thus, the decoy files and the secrets file have the same timestamps. Those skilled in the art will appreciate that the timestamps on the decoy files and/or the secrets file may be modified such that all timestamps are the same or within an appropriate range (as defined above).

In Step 233, identifiers of members of the group are received. Specifically, an identifier for each member of the group is received. The identifier may be a unique identifier, a nickname, or another identifier.

In Step 235, connection information to create a secure connection to each member of the group is received. Specifically, the connection information identifies how to access the member through a secure communication channel if it exists. Alternatively, the connection information may specify general contact information, such as a phone number, an internet protocol (IP) address, or other contact information. In Step 237, the connection information is stored with the identifiers for the group. The connection information and the identifiers may be stored in a separate file, such as a configuration file associated with the security application. Further, the same connection information may be used by the member for multiple groups that have common members.

Although not shown in FIGS. 2A-2B, additional groups may be added by repeating Steps 205-237 for each group. In one or more embodiments of the invention, when a new group is created, the timestamps of all existing files are updated to match the new group. The timestamps may be updated, for example, using APIs provided by the operating system to force an update of the timestamps.

Figure 3:
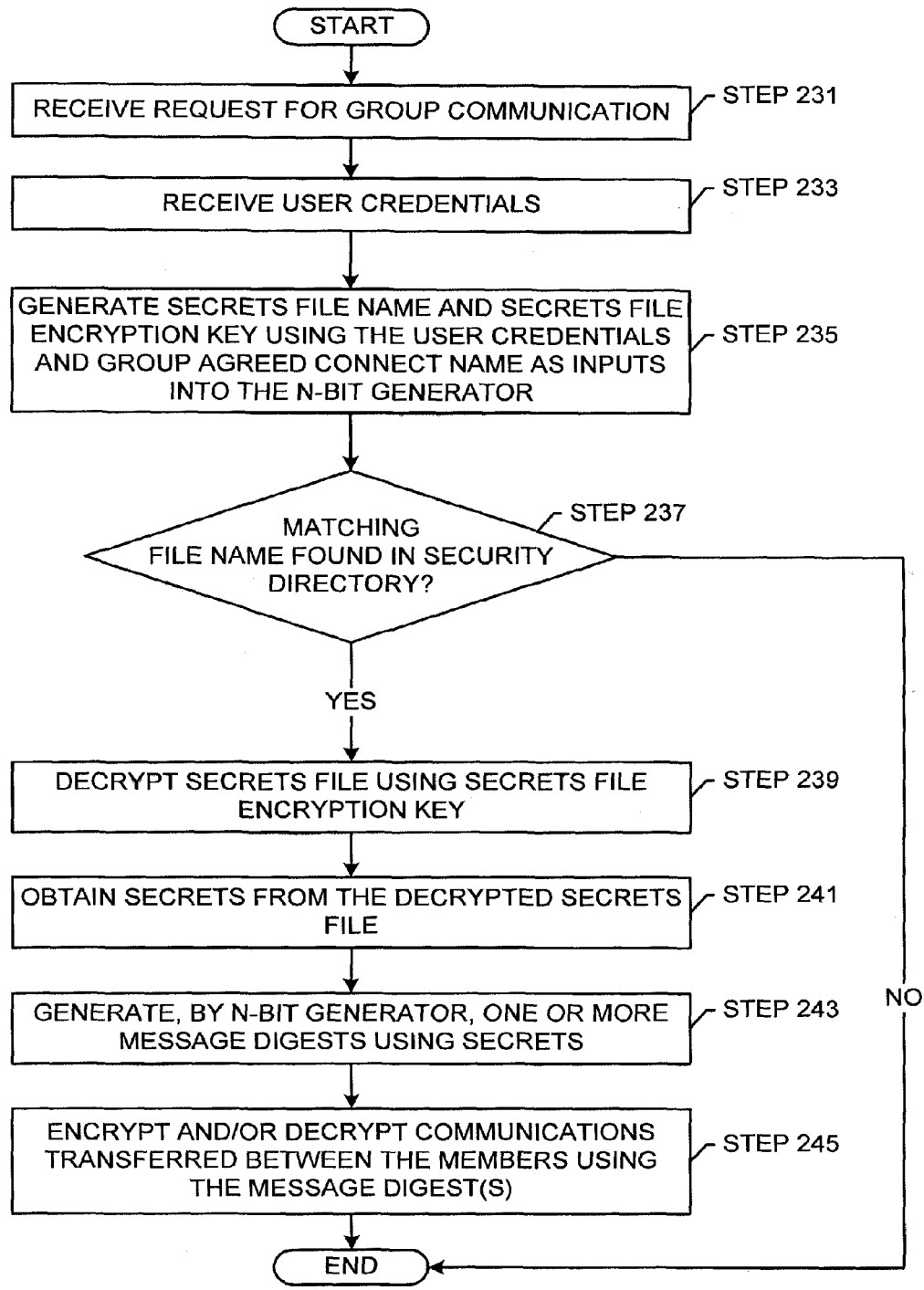

FIG. 3 shows a flowchart for communicating between members of the group in one or more embodiments of the invention. In Step 231, a request for group communication is received. The request may be received from the user using the member, an application executing on the member or executing on a computer system connected to the member, another member, etc.

For example, the user may start the security application and select a group using the group name to start sending communications. The user may also select the application (e.g., email application, chat application, etc.) that the user will use for the communication. In response, the security application may access the connection information for other members of the group and send an invite to the other members using the connection information. The invite may include the group agreed connect name and indicate that the member is starting a communication session for the group having the specified connect name. Additionally, or alternatively, the invite may be sent with the first communication from the member.

As a second example, the user may use an application (e.g., a email application, a chat application, an Internet browser) to start a communication session with another user. The security application may intercept the user's connection request, identify the members of the group corresponding to the recipient users, and invite the other members of the group to the communication session using the group agreed connect name and the connection information for the other members.

As a third example, the request for group communication may be initiated by the security application receiving an invite to the communication session from another member of the group. In response, the security application may notify the user that a communication session is requested in accordance with one or more embodiments of the invention.

The above are only some examples of how a request for communication is received. The request for communication may be received in other manner without departing from the scope of the invention.

In Step 233, user credentials are received. In one or more embodiments of the invention, the member prompts the user to provide the user credentials. For example, the user interface of the security application may display one or more input boxes for the user to submit the user's credentials.

In Step 235, the n-bit generator generates the secrets file name and the secrets file encryption key using the user's credentials and the group agreed connect name. Specifically, the n-bit generator generates a message digest having the secrets file name and the secrets file encryption key using the aforementioned inputs. The encryption module extracts the aforementioned components from the message digest. Generating the message digest and extracting the secrets file encryption key may be performed as discussed above with reference to Steps 211 and 213 in FIG. 2.

In Step 237, a determination is made whether a matching file name is found in the security directory. If a matching file name is found, then the user's credentials are correct and the secrets file is identified. If the matching file name is not found, then the received user's credentials may be incorrect. The security application may allow the user to re-submit the credentials and/or deny access to the user.

In Step 239, if the matching file name is found, the secrets file is decrypted using the secrets file encryption key. Specifically, the encryption module applies the encryption algorithm to the encrypted secrets file (i.e., the file identified in Step 237) using the secrets file encryption key to create a decrypted secrets file.

In Step 241, the secrets are obtained from the decrypted secrets file. In one or more embodiments of the invention, the secrets may be obtained based on the type of unique secret identifier and/or a secrets grouping identifier. For example, the communication request may specify an application used in the communication. Accordingly, encryption module may identify the secrets grouping identifier corresponding to the specified application. The encryption module obtains the secrets from the secrets file having the specified secrets grouping identifier.

In one or more embodiments of the invention, rather than opening the secrets file to obtain the secrets, the secrets file may be copied to a temporary memory location, such as cache memory, and the copy may be opened to obtain the secrets. Thus, if the dynamic secrets are not updated at the end of the communication session, then the metadata of the secrets file remains unchanged. When the metadata of the secrets file remains unchanged, then the metadata of the decoy files does not need to change. Further, the contents of the temporary memory location may be destroy so as to destroy the copy of the secrets file. The destruction may include overwriting the temporary location multiple times in accordance with one or more embodiments of the invention.

As another example, the communication request may include the unique secret identifier. In the example, the encryption module may extract the secret having the unique secrets identifier from the secrets file.

By way of another example, the encryption module may randomly select secrets (e.g., a static and dynamic secret) and send the unique secrets identifier of the randomly selected secrets to the other members of the group.

The above are only a few examples for obtaining secrets from the secrets file. Other methods may be used without departing from the scope of the invention.

In Step 243, the n-bit generator generates one or more message digests using the secrets. Generating one or more message digests is discussed below and in FIGS. 4A and 4B.

Continuing with FIG. 3, the encryption module encrypts and decrypts communications transferred between the members of the group using an encryption key parsed from the message digest. As discussed below, from the message digest(s), an encryption key is generated. The encryption module applies the encryption key and an encryption algorithm to each communication for sending to encrypt the communication. The encrypted communication is sent to the other members of the group. Similarly, the encryption module applies the encryption key and the encryption algorithm to each received communication to decrypt the received communication.

In one or more embodiments of the invention, the encryption module intercepts the communications sent and received from the member to the group or from a computer system connected to the member to the group. The encryption module performs the encryption and decryption steps without input from and transparently to the user (or other computer system to which the security application is connected) in one or more embodiments of the invention.

In one or more embodiments of the invention, the security application may be used for communications between subgroups, in which only some of the members are present using the secrets for the group. In one or more embodiments of the invention, the sub-group may be spawned into a new group. Additionally, or alternatively, when only the subgroup is communicating, the dynamic secret is not updated for the entire group.

Figure 4A:
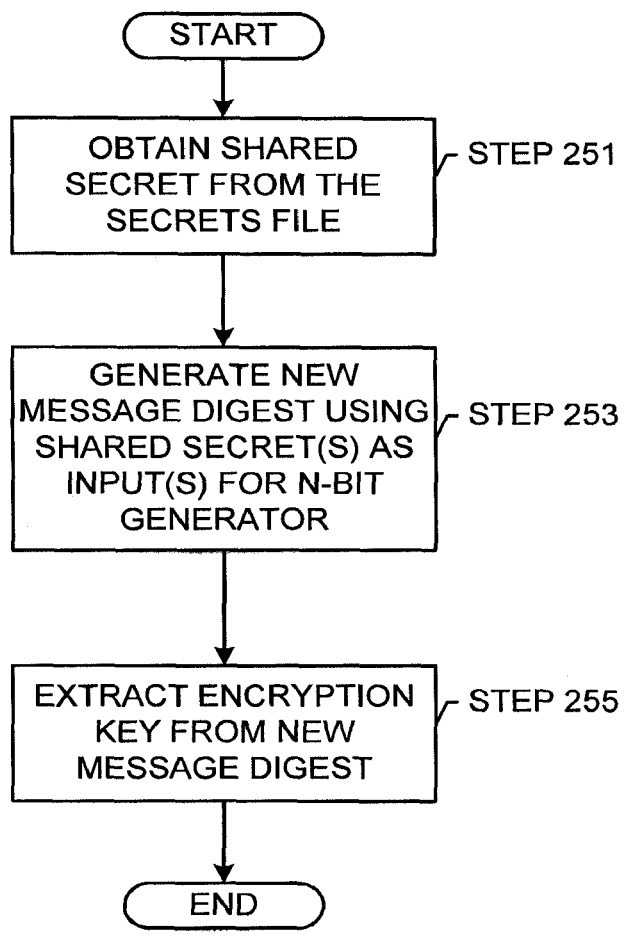
Figure 4B:
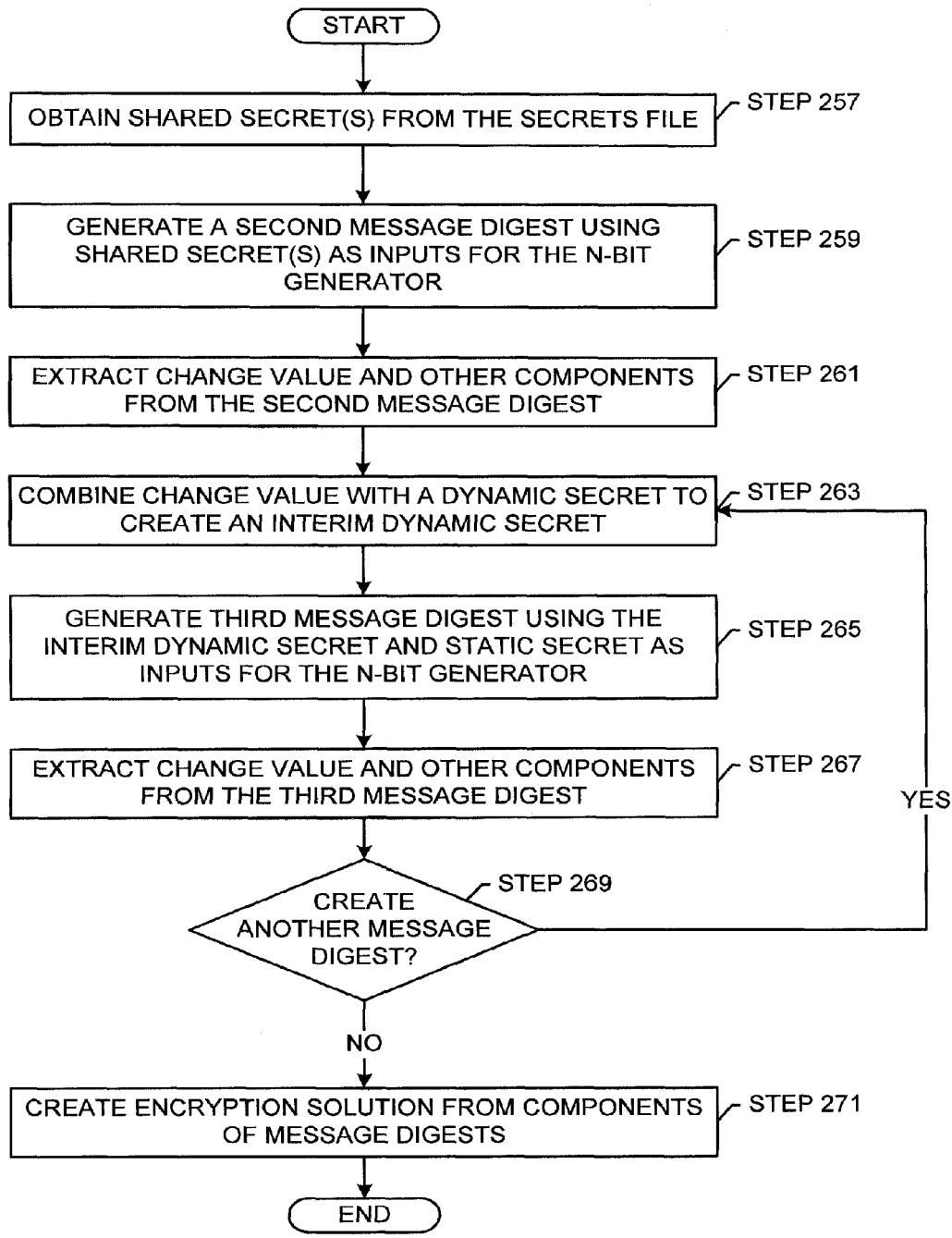

FIGS. 4A and 4B show flowcharts for using the initial message digest to generate an encryption key. As shown in FIG. 4A, in Step 251, a shared secret(s) is obtained from the secrets file. In Step 253, a new message digest is generated using the shared secret(s) as inputs for the n-bit generator. For example, the encryption module may call the n-bit generator and pass the parameters of the shared secret(s).

In Step 255, an encryption key is extracted from the resulting message digest. Extracting the encryption key may include the encryption module identifying the bit positions corresponding to the encryption key and separately storing the series of bits in the identified bit positions as the encryption key. In addition to extracting the encryption key, algorithm selector bits, key length and other components of the message digest may be extracted. The algorithm selector bits may be used, for example, as an index to the algorithm selector table to identify an encryption algorithm to use to encrypt the communications.

FIG. 4B shows another example flowchart for using the initial message digest. Specifically, FIG. 4B shows an example for generating multiple message digests, where each message digest includes some of the components for encrypting a communication. In Step 257, the shared secret and dynamic secret are obtained from the secrets file. Obtaining the shared secret and the dynamic secret may be performed as discussed above.

In Step 259, a second message digest is generated using the shared secret and the dynamic secret as inputs for the n-bit generator. Generating the second message digest may be performed in a similar manner to that discussed above with reference to Step 253 in FIG. 4A.

In Step 261, the change value and other components are extracted from the second message digest. Extracting the components may be performed in a manner similar to the extraction of the encryption key as discussed above in Step 255 of FIG. 4A. The other components that are extracted may include, for example, the most significant bits of the encryption key, the least significant bits of the encryption key, the algorithm selector bits, etc.

In Step 263 of FIG. 4B, the change value is combined with the dynamic secret to create an interim dynamic secret. Combining the change value with the dynamic secret may be performed, for example, by a bit shuffler. Specifically, any of the operations discussed above with respect to the bit shuffler may be performed to combine the change value with the dynamic secret. In one or more embodiments of the invention, a prime number is added to the change value or result to account for a possibility that the change value may be zero. For example, the combination may be the change value XOR'd with the dynamic secret plus one.

In Step 265, a third message digest is generated using the interim dynamic secret and the static secret as inputs to the n-bit generator. Step 265 may be performed, for example, in a manner similar to the above discussion with reference to Step 259. In one or more embodiments of the invention, rather than performing Step 263 to create an interim dynamic secret and then performing Step 265 to generate a third message digest using the interim dynamic secret, the third message digest may be generated using the change value, the dynamic secret, and the static secrets as inputs into the n-bit generator.

In Step 267, the change value and other components are extracted from the third message digest in accordance with one or more embodiments of the invention. Extracting the change value and the other components may be in a manner similar to the above discussion with reference to Step 261.

In Step 269, a determination is made whether to create another message digest. In one or more embodiments of the invention, each security application is configured to create an identical number of message digests. Additional message digests may be generated to create additional bits for an encryption key or to create additional components.

If a determination is made to create an additional message digest, then the steps repeat starting with Step 263. In Step 263, the change value extracted in Step 267 is used with the dynamic secret to create a new interim dynamic secret. Alternatively, rather than using the dynamic secret for subsequent message digests, the previously created interim dynamic secret may be used.

Alternatively, if a determination is made not to create another message digest, an encryption solution is created from the components of the message digests in Step 271. For example, the least significant bits of the encryption key may be combined with the most significant bits of the encryption key to create a single encryption key. The encryption solution may be used to encrypt and decrypt communications. Encrypting a communication may be performed for example, by accessing the algorithm selector table to identify the encryption algorithm corresponding to the algorithm selector bits in the message digest. The communication to be encrypted is encrypted by applying the identified encryption algorithm with the encryption key to the communication. The resulting encrypted communication may be sent to the members and/or stored (e.g., stored on a local or remote storage device). In one or more embodiments of the invention, when an encrypted communication is stored, dynamic secrets are not used to create the encryption key used to encrypt the communication.

During or at the end of a session, the members of a group may agree to change the encryption key and/or the dynamic secret values. For example, the agreement may be based on a signal passed between the members when one of the members elects that the encryption key should change. As another example, the agreement may be based on a pre-agreed period at which a new encryption key is generated. For example, the members may agree that a new encryption key should be generated every five minutes, with every 20 communications, after 256K bits are exchanged, etc.

FIG. 5A shows a flowchart for changing an encryption key. In Step 281, a change of encryption key is initiated by the group or one of the members thereof. As discussed above, the initiation may be based on a message, a pre-agreed period, etc.

In Step 283, intermediate results of the last performance of the n-bit generator and the last generated change value are obtained. As discussed above, the intermediate results may correspond to the output of the bit shuffler prior to performing the hash function. Further, each member may extract the change value from the last generated message digest.

In Step 285, each member generates a new message digest using the intermediate results and the last change value as inputs to the n-bit generator. In Steps 283 and 285, rather than using the intermediate results, the dynamic secret, the dynamic secret and the static secret, or the interim dynamic secret may be used in accordance with one or more embodiments of the invention.

In Step 287, a new encryption key is extracted from the new message digest. Extracting the new encryption key may be performed as discussed above with reference to Step 255 of FIG. 4A. After the new encryption key is extracted the new encryption key may be used to encrypt and decrypt communications between the members of the group. In one or more embodiments of the invention, the encryption key could be an encryption solution. The encryption solution may include, for example, the encryption key, algorithm selector bits for selecting an encryption algorithm, and/or other components used for encryption.

FIG. 5B shows an example flowchart for changing the dynamic secret values at the end of a communication session in accordance with one or more embodiments of the invention. In Step 289, a communication session is finalized with the group. For example, the group members may send a message ending the communication session. Each member may wait until the member receives confirmation from all other members of the group.

In Step 291, the initial dynamic secret and the final change value used in the communication session are obtained. For example, the initial dynamic secret may be the secret generated in the initial message digest or a secret stored in the secrets repository. The final change value may correspond to the last generated change value. For example, the final change value may be obtained as discussed above with reference to Step 283 in FIG. 5A.

Continuing with FIG. 5B, in Step 293, a new message digest is generated using the initial dynamic secret and the change value as inputs to the n-bit generator. In Step 295, the new dynamic secret is extracted from the new message digest. The new dynamic secret may replace the initial dynamic secret in the secrets file. Specifically, in Step 297, each member of the group may store the new dynamic secret in their corresponding secrets repository. Because each member generates and stores the same new dynamic secret, the members use the same secrets in the next communication session.

Further, each member updates the secrets files and the decoy files to update the file time stamps in Step 299. Specifically, each files may be opened, modified, and closed. The modification may be changing a character into a new randomly generated character and saving the changed decoy file. As another example, the modification may be writing a character to the decoy file, saving the decoy file, and then removing the character from the decoy file and the secrets files. In one or more embodiments of the invention, the update to the secrets file is performed after some of the decoy files are updated and prior to the final decoy files are updated. By modifying the decoy files when the secrets file is modified, the timestamps of the decoy files may be automatically updated. Rather than performing the modification, the metadata of the files may be updated by manipulating the metadata directly, such as through an API of an operating system, or accessing the metadata. Thus, a nefarious user or computer system could not access the modification timestamp to identify the secrets file.

Figure 6A:
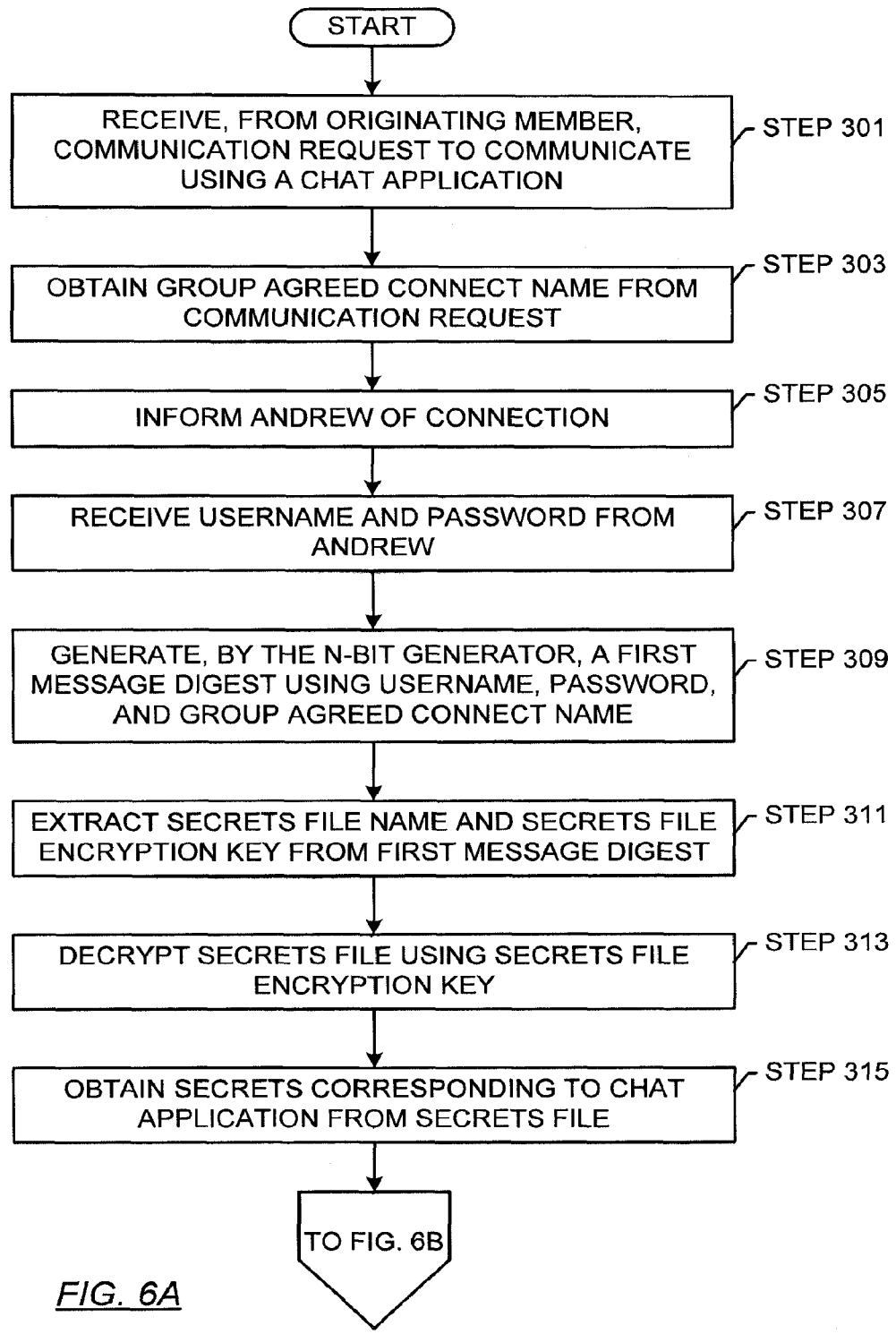

FIGS. 6A-6B shows an example communication session in accordance with one or more embodiments of the invention. The following is for example purposes only. In the following example, consider the scenario in which Opal and Andrew want to communicate via a chat application. Opal's computing device is an external token device that connects to a computer system that includes a chat application. Opal's token executes the security application and includes the secrets file. Opal's computing device is referred to below as the originating member. Similarly, Andrew's computing device is a smart phone that has a chat application and a security application. Andrew's smart phone is referred to below as the answering member.

In the example, Opal opens her chat application on her computer system and connects her token to the computer system. Opal selects Andrew as the recipient of the communication. The chat application sends a request to the token to open a communication session with Andrew. The security application executing on the token receives the request and obtains the group agreed connect name for the group having only Opal and Andrew. The security application also identifies the connection information for Andrew. The security application sends Andrew a communication request to communicate via chat.

FIGS. 6A-6B shows flowcharts from the perspective of the answering member (i.e., Andrew's smart phone). Starting with FIG. 6A, in Step 301, the answering member receives a communication request to communicate using a chat application. Specifically, Andrew's smart phone receives, from Opal's token, a request specifying the group agreed connect name, and an identifier of a chat session. Accordingly, in Step 303, the group agreed connect name is obtained from the communication request.

In Step 305, the answering member informs Andrew of the communication request. Specifically, the security application on the smart phone may have a notification mechanism, such as an icon, ring tone, or other notification mechanism, that informs Andrew that a communication request is received. At this stage, Andrew may decide whether to accept or reject the communication request. If Andrew rejects the communication request, then the answering member ends the communication session with Opal. (not shown)

However, if Andrew accepts the communication request, then Andrew submits his username and password. Accordingly, in Step 307, the answering system receives a username and password from Andrew.

In Step 309, the n-bit generator executing on the answering system generates a first message digest using the username, password, and the group agreed connect name as inputs. For example, the n-bit generator may XOR the username, password, and group agreed connect name to create an intermediate result. The intermediate result may be input to an MD5 hash function to create a pseudo-random string as the first message digest.

In Step 311, the answering member extracts the secrets file name and the secrets file encryption key from the first message digest. The secrets file name may be, in the example, the last 128 bits of the first message digest and the secrets file encryption key may be, in the example, the first 256 bits of the message digest. Based on the extracted secrets file name, the answering member identifies the secrets file on Andrew's smart phone. Because the first message digest is a pseudo-random bit string, the secrets file name is also pseudo random and can only be identified if the username, group agreed identifier, and password are correct. Thus, by finding the secrets file name, the security application authenticates Andrew as the user of the smart phone. Alternatively, the smart phone might verify the user name and password independent of the secure chat application.

In Step 313, the answering member decrypts the identified secrets file using the secrets file encryption key. Specifically, the answering member uses the secrets file encryption key and a symmetric encryption algorithm to decrypt the secrets file. From the decrypted secrets file, the answering member extracts the secrets corresponding to the chat application in Step 315. For example, the answering member may identify that the fifth secret is the secret corresponding to the chat application based on a pre-defined configuration parameter or an identifier stored with the fifth secret which is 384 bits and the beginning bit is bit 84.

Continuing with FIG. 6B, in Step 317, the n-bit generator on the answering system generates a second message digest using the secret. The answering system's encryption module may extract from the fifth secret, the dynamic secret and the static secret and provide the dynamic secret and the static secret as inputs to the n-bit generator. The n-bit generator combines the dynamic secret and the static secret to produce the second message digest. For example, the initial message digest may correspond to message digest (350) shown in example FIG. 6C. Referring to FIG. 6C, a message digest (350) may include an originating member's one-time password (352), discard bits (354), an encryption key most significant bits (356), and a change value (358).

The originating member's one-time password (352) is a series of bits generated by the n-bit generator for the answering member to authenticate the originating member. Specifically, because both the originating member and the answering member generate the same message digest (e.g., example message digest (350)), the originating member's one-time password (352) is the same for the first member and the second member. Accordingly, if the first member's one-time password (352) that the first member sends to the second member is identical to the second member's generated first member's one time password, then the second member knows that the first member is authentic. Specifically, the first member knows that the second member received the same input and had an n-bit generator that was capable of performing the same operations. Further, in one or more embodiments, once the first member and second member passwords have been confirmed, an extremely high probability exists that the other corresponding bits of the message digest also match between systems.

In one or more embodiments of the invention, prior to sending the one-time passwords, the one-time passwords are encrypted using an encryption algorithm and an encryption key. In such embodiments, the one-time passwords are sent encrypted. The receiver may encrypt their generated one-time password and compared the encrypted generated one-time password with the received one-time password. As an alternative, the receiver may decrypt the received one-time password and then compare the decrypted one-time password with the generated one-time password.

Discard bits (354) are bits that are ignored when creating the encryption solution. Specifically, discard bits are bits that prevent the nefarious user or computer system from understanding the message digest. By having discard bits, the nefarious user or computer system may be unable to ascertain which bits are actually used for the encryption solution.

The session encryption key most significant bits (MSB) (356) correspond to a portion of the encryption key. Specifically, the encryption key may be divided into one or more parts. A portion of the encryption key may be located in a first message digest while a second portion is located in another message digest. Because all members use the instances of the same n-bit generator to generate the message digests, the encryption key generated by each of the members is the same. Thus, the encryption key does not need to be communicated between the members. Moreover, the encryption key may be stored in the security application and not provided through any interface to any user. Thus, members (and users of the members) that leave the group remain unaware of the encryption key used to encrypt the data.

In one or more embodiments of the invention, a change value (358) provides a pseudo-random value to spawn a new message digest. For example, the change value may be used to create a new encryption key or create a new dynamic secret. Further, the stored secrets may be inputted to the n-bit generator to spawn temporary use secrets. All of the spawned secrets are used only during a session in accordance with one or more embodiments of the invention. After the session, the spawned secrets are destroyed so as to be no longer accessible or otherwise obtainable through any nefarious methods. Similar to the temporary use secrets, the change value is destroyed once combined with the appropriate dynamic secret value.

Returning to the example message digest (350), FIG. 6C is only one example of the components of a message digest. Some of the components may be removed while other components may be added.

Returning to FIG. 6B, in Step 319, the encryption module on the answering system extracts the originating member's one time password, the encryption key's most significant bits, and a change value from the second message digest. The extracted change value is combined with the original dynamic secret in Step 321 to create an interim dynamic secret in the example. The interim dynamic secret may be obtained by performing an XOR operation on the change value and the original dynamic secret plus one.

Using the interim dynamic secret, the n-bit generator generates the third message digest in Step 323. For example, the initial message digest may correspond to message digest (360) shown in example FIG. 6D. Referring to FIG. 6D, a message digest (360) may include an answering member's one-time password (362), discard bits (364), an encryption key least significant bits (366), and a change value (368). The answering member's one-time password (362), discard bits (364), an encryption key least significant bits (366), and a change value (368) are similar to the originating member's one-time password (352), discard bits (354), an encryption key most significant bits (356), and a change value (358) in FIG. 6C.

Specifically, the answering member's one-time password (362) is a series of bits generated by the n-bit generator for the originating member to authenticate the answering member. Discard bits (364) are bits that are ignored when creating the encryption solution. The session encryption key least significant bits (LSB) (366) correspond to a second portion of the encryption key. The change value (368) provides a random value to create a new message digest.

Returning to the example message digest (360), FIG. 6D is only one example of the components of a message digest. Some of the components may be removed while other components may be added.

Returning to FIG. 6B, the answering member extracts the answering member's one-time password, the encryption key's least significant bits, the change value from the third message digest.

Although not discussed above, after the originating member finds the secrets file located on the originating member, the originating member performs the same steps as the answering member. Thus, both the originating member and the answering member generate the second and third message digests. The answering member sends the answering member's one-time password to the originating member in Step 327. The originating member sends the originating member's one-time password to the answering member. Accordingly, the answering member receives the originating member's one-time password in Step 329.

Both the originating member and the answering member compare the received one-time password with the generated one-time password to determine if the received password is identical to the generated password. For example, in Step 331, the answering member determines whether the received originating member's one-time password is equal to the generated originating member's one-time password. If the two passwords are not equal, then the answering member may stop communication with the originating member. Similarly, although not shown, the originating member determines whether the received answering member's one-time password is equal to the generated answering member's one-time password. If the two passwords are not equal, then the originating member may stop communication with the answering member.

However, in Step 333, if the passwords are equal, then the encryption key's most significant bits are concatenated with the encryption key's least significant bits to create the encryption key.

At this stage, Opal and Andrew may start communicating via the chat application. The encryption modules intercept each outgoing communication and encrypt it using the encryption key in Step 335. Similarly, the encryption modules intercept each incoming communication and decrypt it using the encryption key (not shown). Further, Steps 301, 303, and 309-335 in FIGS. 6A and 6B may be performed transparently to both Opal and Andrew. Thus, neither Opal nor Andrew need to be aware of the encryption. Further, in one or more embodiments of the invention, both Opal and Andrew cannot view the secrets or the encryption key. Thus, neither Opal nor Andrew can consciously or unconsciously provide a nefarious user with access to the shared secrets.

Figure 7A:
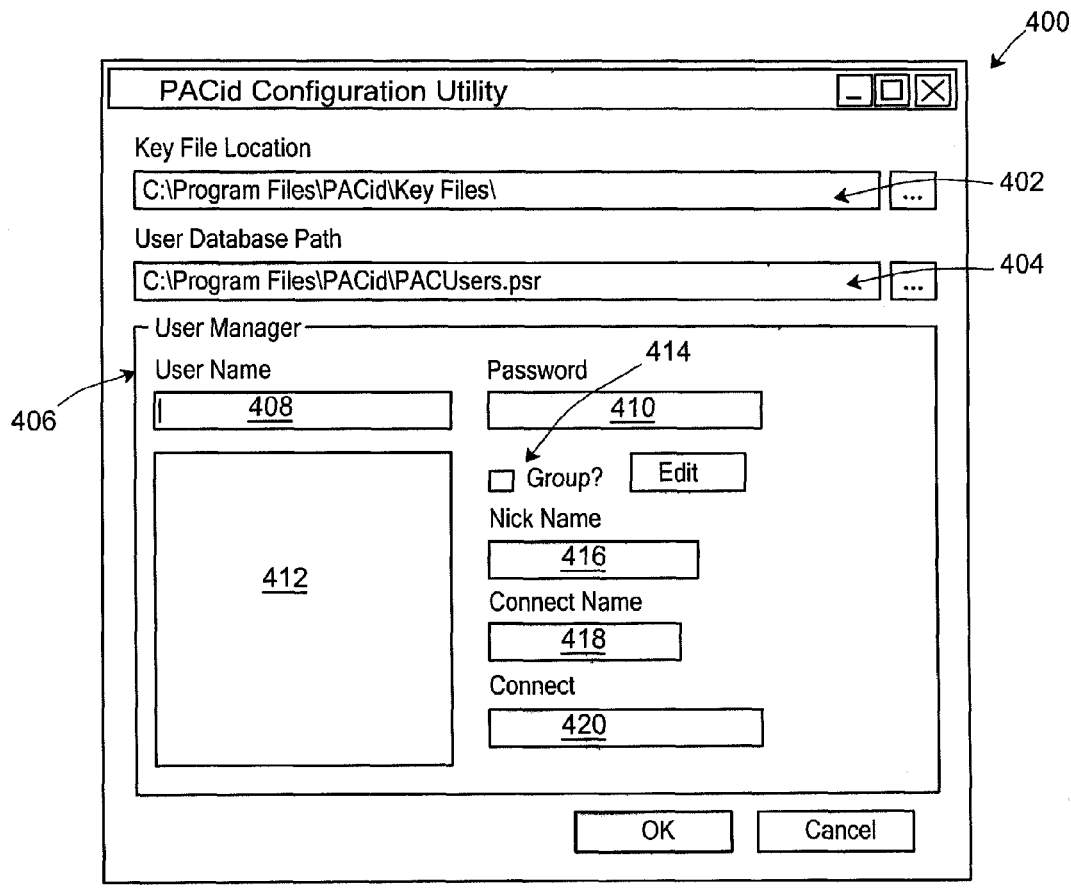
Figure 7B:
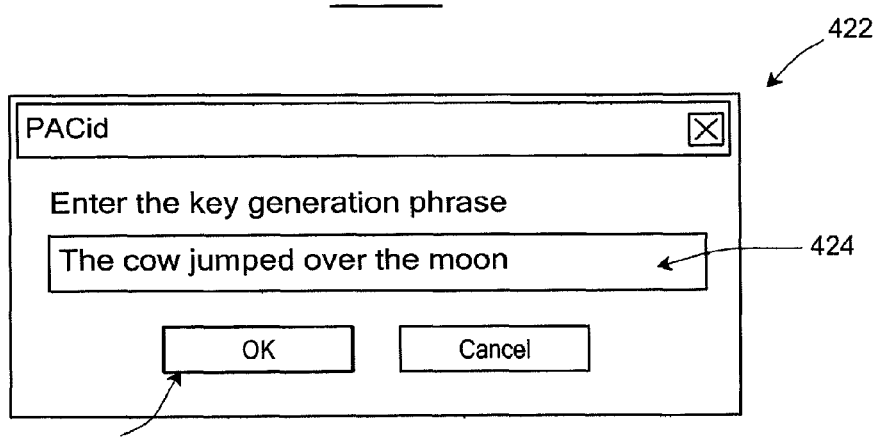
Figure 7C:
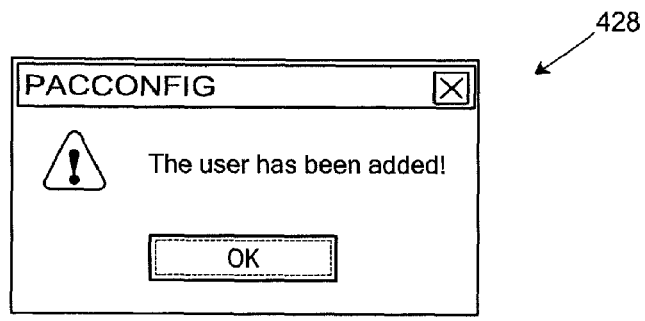

FIGS. 7A-7E show an example in accordance with one or more embodiments of the invention. The following example is for example purposes only and not intended to limit the scope of the invention. FIG. 7A-7C show an example user interface for the configuration utility in accordance with one or more embodiments of the invention.

As shown in FIG. 7A, the initial configuration utility window (400) includes an input box for the user to specify the location of the security directory (402) and an input box for the user to specify a location for storing a database about users (404). Input box (402) and input box (404) may be constrained such that only a user corresponding to an administrator can change the location. Alternatively, or additionally, the input box (402) and input box (404) may be constrained so that the user can only provide locations that are on the member itself.

Additionally, in the example, the initial configuration utility window (400) includes a user manager (406). The user manager (406) allows a user to enter data specific to the user. Specifically, a user name input box (408) and password input box (410) allows the user to enter the username and password, respectively, that the user will use each time the user uses the security application. The user may be prompted to re-enter the user password in an input box (not shown) to verify that the user entered his/her intended password.

Text box (412) provides a list of groups with whom the user may communicate. Specifically, text box (412) shows a list of the groups that the member has already added. Entries in the list may be displayed as a nickname of the group, the connect name, or other information useful to the user.

Check box (414), nick name input box (416), connect name input box (418), and connect input box (420) allows the user to submit data for a specific group. For example, if selected, check box (414) designates that the group includes more than two members. The user may submit the nick name of the group in the nick name input box (416). The user may submit the group agreed connect name of the group in the connect name input box (418). The user may submit the connection information for the group in the connect input box (420). The connect input box (420) may be used for providing the connection information for the entire group. If the check box (414) is selected, the user interface may display additional input boxes to allow a user to submit nick names and connection information for each member of the group. The additional input boxes may be displayed to provide member specific connection information.

Continuing with the example, FIG. 7B shows a user interface window (422) for submitting the group agreed seed. Specifically, the user interface window (422) may be displayed while the user is adding a new group in one or more embodiments of the invention. The user may enter the group agreed seed in input box (424) and select okay (426) to submit the group agreed seed.

In response to the user entering the group and/or the user's information, the user interface may display the window (428) shown in FIG. 7C to show that the group has been added. Thus, the secrets file for the group may be generated.

Figure 7D:
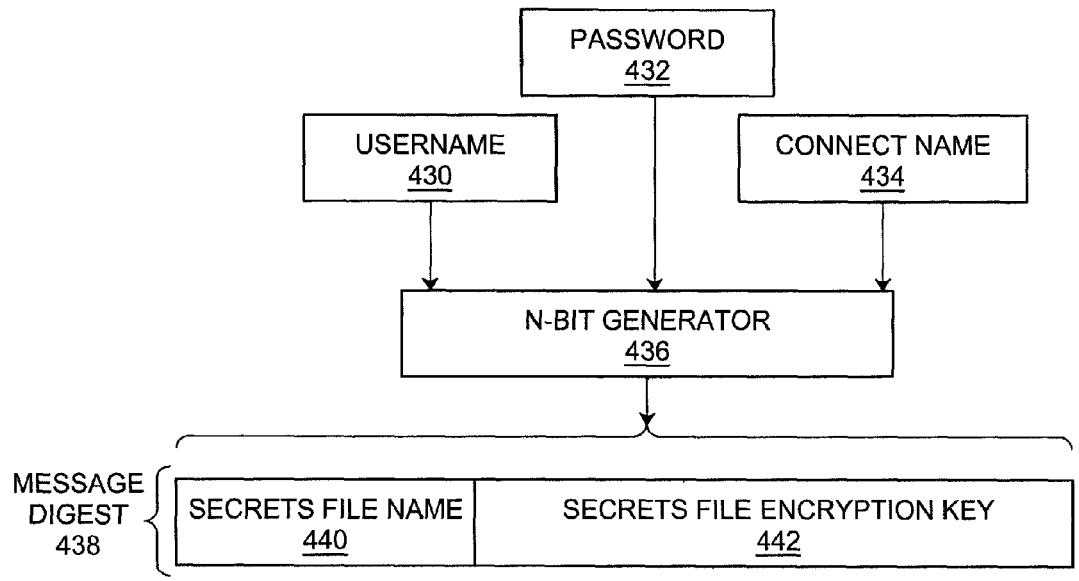

FIG. 7D shows an example schematic diagram for generating the secrets file name and encryption key/solution. As shown in FIG. 7D, the username (430) that the user submitted in the username input box (408 in FIG. 7A), the password (432) that the user submitted in the password input box (410 in FIG. 7A), and the group agreed connect name (434) that the user submitted in connect name input box (418) are provided as inputs to the n-bit generator (436).

With the inputs, the n-bit generator (436) produces message digest (438). The message digest includes a secrets file name (440) and a secrets file encryption key (442). Accordingly, secrets created using the group agreed seed submitted in input box (424 in FIG. 7B) are stored in a secrets file, which is saved with secrets file name (440). The secrets file encryption key (442) is used to encrypt the secrets file. Accordingly, the secrets file is stored in the secrets file directory.

Figure 7E:
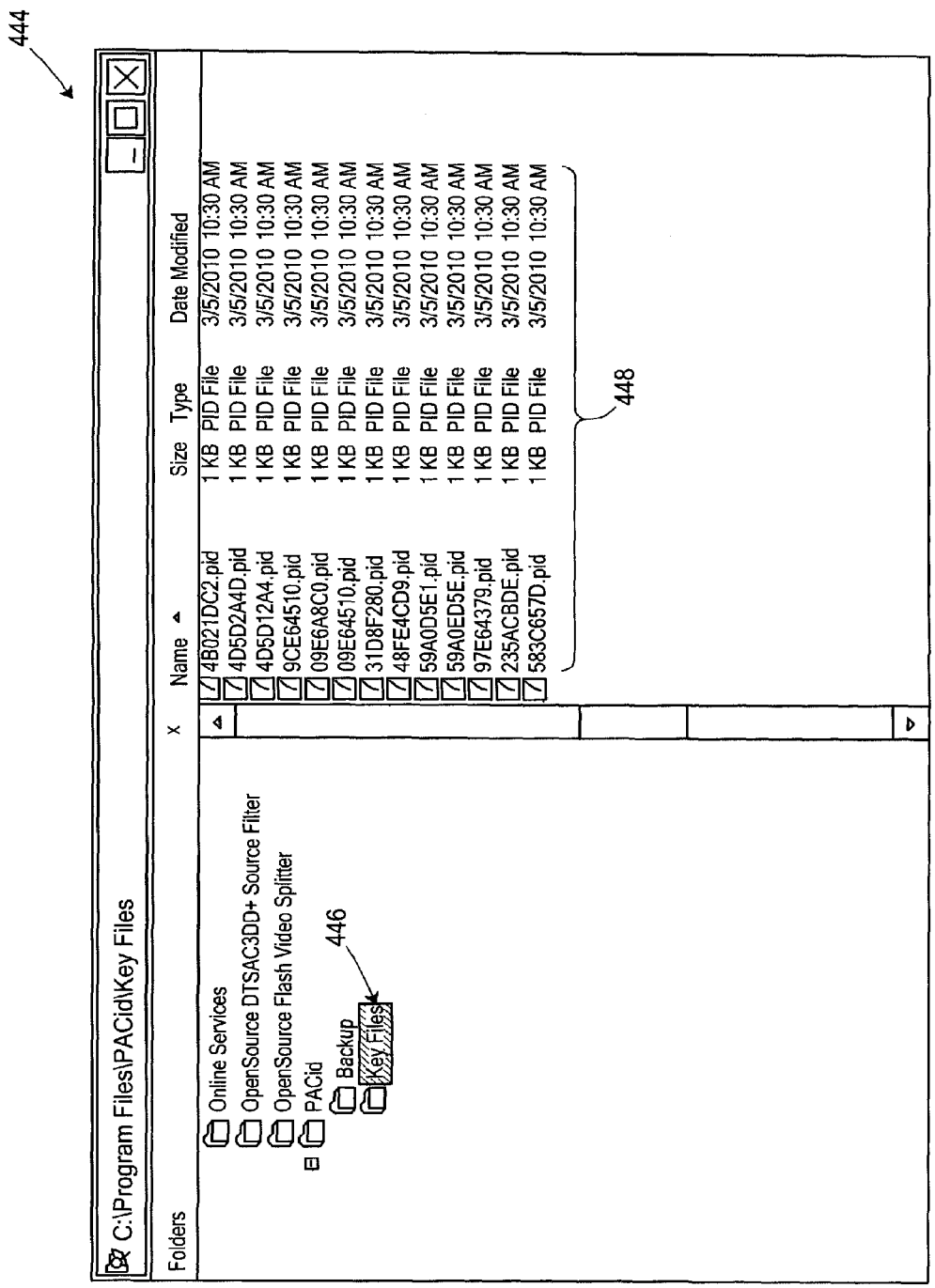

FIG. 7E shows an example file interface window (444) showing the secrets files directory (referred as key files in FIG. 7E) (446). As shown in the example, the contents of the secrets file directory (448) includes the secrets file and decoy files. However, because the secrets file name and the decoy file names are pseudo-random strings of characters and the secrets file and the decoy files have the same metadata, the secrets file is indistinguishable from the decoy files. For example, the security application may use the n-bit generator and similar procedures to generate the secrets as to generate the decoy files. In the example, the encryption module may call the n-bit generator four times to produce the desired number of secrets bits, and, therefore, times to produce the sufficient bits for each of ten decoy files. As another example, the encryption module may request fifty iterations of the n-bit generator to produce the decoy files and the secrets file. Because the decoy files in the example are similarly produced so as to be indistinguishable, the nefarious computer system or user could not identify the secrets file based on the information provided in the list of files in the file interface window (444).

Figure 8:
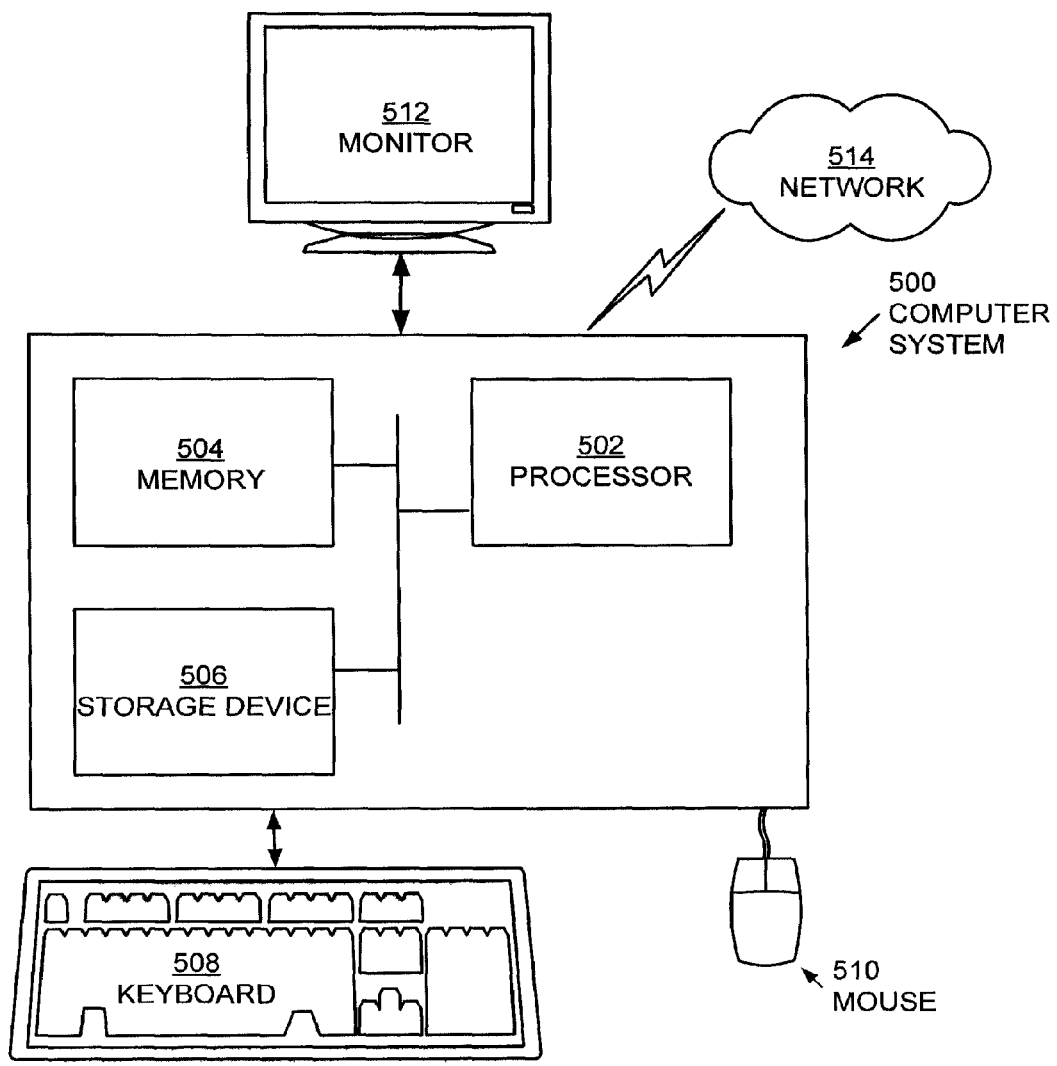
FIG. 8 shows a computing device in accordance with one or more embodiments of the invention.

Embodiments of the invention may be implemented on virtually any type of computer system regardless of the platform being used. The computing device may be the computer system, execute on the computer system, be an external device of the computer system, etc. For example, as shown in FIG. 8, a computer system (500) includes one or more computing processor(s) (502), associated memory (504) (e.g., random access memory (RAM), cache memory, flash memory, etc.), an internal and/or external storage device (506) (e.g., a hard disk, an optical drive such as a compact disk drive or digital video disk (DVD) drive, a flash memory stick, universal serial bus (USB) drive, smart card, smart phone, etc.), and numerous other elements and functionalities typical of today's computers (not shown). The computer system (500) may also include input means, such as a keyboard (508), a touch screen (512), a mouse (510), or a microphone (not shown). Further, the computer system (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other type of network) via a network interface connection; wired or wireless (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Computer readable program code to perform embodiments of the invention may be stored on a computer readable medium such as a compact disc (CD), a diskette, a tape, physical memory, or any other physical computer readable storage medium that includes functionality to store computer readable program code to perform embodiments of the invention. In one embodiment of the invention the computer readable program code, when executed by a processor(s), is configured to perform embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for protecting a secrets file, comprising:
   initiating configuration of a group;
   obtaining a group agreed connect name corresponding to the group;
   obtaining a username and password of a user of a member of the group;
   generating a first message digest using the group agreed connect name, the username, the password, and an n-bit generator;
   extracting a secrets file name and a secrets file encryption key from the first message digest;
   obtaining a group agreed seed for a secrets file;
   generating a second message digest using the group agreed seed and the n-bit generator;
   extracting a first secret from the second message digest;
   encrypting, using the secrets file encryption key, the secrets file in a security directory, wherein the secrets file is associated with the secrets file name, and wherein the secrets file comprises the first secret;
   generating a third message digest using the first secret;
   extracting a first decoy file name and first decoy file contents from the third message digest;
   creating a first decoy file using the first decoy file name and the first decoy file contents; and
   storing the first decoy file in the security directory,
   wherein the security directory comprises a plurality of decoy files comprising the first decoy file, and
   wherein each of the plurality of decoy files comprises decoy file contents, wherein each of the plurality of decoy files are a same size as the secrets file.

2. The method of claim 1, wherein the first secret is modified prior to generating the third message digest.

3. The method of claim 1, further comprising:
   opening, by the member of the group, a chat application based on a request by the user;
   initiating, by the chat application, a communication with the group;
   transparently to the user and by a security application:
      obtaining the first secret from the secrets file;
      intercepting a message from the chat application to the group;
      encrypting, using the first secret, the message from the chat application to obtain an encrypted message; and
      sending the encrypted message to the group.

4. The method of claim 1, further comprising:
   transparently to the user and by a security application:
      intercepting a received encrypted message from the group;
      obtaining the first secret from the secrets file in response to intercepting the received encrypted message;
      decrypting the received encrypted message to obtain a received message; and
      sending the received message to a chat application; and
   opening, by the chat application, the received message.

5. The method of claim 1, further comprising:
   storing a plurality of secrets in the secrets file,
   wherein the plurality of secrets comprises the first secret, and
   wherein the plurality of secrets is organized according to a type of communication associated with each secret of the plurality of secrets.

6. The method of claim 1, wherein each of the plurality of decoy files is associated with a modification time within a range of modification times and a modification time of the secrets file is within the range of modification times.

7. The method of claim 1, further comprising:
   extracting a second secret from the second message digest;
   storing an encrypted second secret in the secrets file prior to encrypting the secrets file;
   generating a fourth message digest using the first secret and the second secret; and
   extract an encryption key from the fourth message digest,
   wherein communication between members of the first group are encrypted using the encryption key.

8. A non-transitory computer readable medium comprising computer readable program code embodied therein for performing a method for protecting a secrets file, the non-transitory computer readable medium comprising:
   initiating configuration of a group;
   obtaining a group agreed connect name corresponding to the group;
   obtaining a username and password of a user of a member of the group;
   generating a first message digest using the group agreed connect name, the username, the password, and an n-bit generator;
   extracting a secrets file name and a secrets file encryption key from the first message digest;
   obtaining a group agreed seed for a secrets file;
   generating a second message digest using the group agreed seed and the n-bit generator;
   extracting a first secret from the second message digest;
   encrypting, using the secrets file encryption key, the secrets file in a security directory, wherein the secrets file is associated with the secrets file name, and wherein the secrets file comprises the first secret;
   generating a third message digest using the first secret;
   extracting a first decoy file name and first decoy file contents from the third message digest;
   creating a first decoy file using the first decoy file name and the first decoy file contents; and
   storing the first decoy file in the security directory,
   wherein the security directory comprises a plurality of decoy files comprising the first decoy file, and
   wherein each of the plurality of decoy files comprises decoy file contents, wherein each of the plurality of decoy files are a same size as the secrets file.

9. The non-transitory computer readable medium of claim 8, wherein the first secret is modified prior to generating the third message digest.

10. The non-transitory computer readable medium of claim 8, wherein the method further comprises:
   transparently to the user and by a security application:
      obtaining the first secret from the secrets file;
      intercepting a message from a chat application to the group;

encrypting, using the first secret, the message from the chat application to obtain an encrypted message; and
sending the encrypted message to the group.

11. The non-transitory computer readable medium of claim 8, wherein the method further comprises:
transparently to the user and by a security application:
intercepting a received encrypted message from the group;
obtaining the first secret from the secrets file in response to intercepting the received encrypted message;
decrypting the received encrypted message from the chat application to obtain a received message; and
sending the received message to a chat application.

12. The non-transitory computer readable medium of claim 8, wherein the method further comprises:
storing a plurality of secrets in the secrets file,
wherein the plurality of secrets comprises the first secret, and
wherein the plurality of secrets is organized according to a type of communication associated with each secret of the plurality of secrets.

13. The non-transitory computer readable medium of claim 8, wherein each of the plurality of decoy files is associated with a modification time within a range of modification times and a modification time of the secrets file is within the range of modification times.

14. The non-transitory computer readable medium of claim 8, wherein the method further comprises:
extracting a second secret from the second message digest;
storing an encrypted second secret in the secrets file prior to encrypting the secrets file;
generating a fourth message digest using the first secret and the second secret; and
extract an encryption key from the fourth message digest, wherein communication between members of the first group are encrypted using the encryption key.

15. A computing device for protecting a secrets file comprising:
a processor;
a memory; and
software instructions stored in the memory for causing the computing device to:
initiate configuration of a group;
obtain a group agreed connect name corresponding to the group;
obtain a username and password of a user of a member of the group;
generate a first message digest using the group agreed connect name, the username, the password, and an n-bit generator;
extract a secrets file name and a secrets file encryption key from the first message digest;
obtain a group agreed seed for a secrets file;
generate a second message digest using the group agreed seed and the n-bit generator;
extract a first secret from the second message digest;
encrypt, using the secrets file encryption key, the secrets file in a security directory, wherein the secrets file is associated with the secrets file name, and wherein the secrets file comprises the first secret;
generate a third message digest using the first secret;
extract a first decoy file name and first decoy file contents from the third message digest;
create a first decoy file using the first decoy file name and the first decoy file contents; and
store the first decoy file in the security directory,
wherein the security directory comprises a plurality of decoy files comprising the first decoy file, and
wherein each of the plurality of decoy files comprises decoy file contents, wherein each of the plurality of decoy files are a same size as the secrets file.

16. The computing device of claim 15, further comprising software instructions stored in the memory for causing the computing device to:
open, by the member of the group, a chat application based on a request by the user;
initiate, by the chat application, a communication with the group;
transparently to the user and by a security application:
obtain the first secret from the secrets file;
intercept a message from the chat application to the group;
encrypt, using the first secret, the message from the chat application to obtain an encrypted message; and
send the encrypted message to the group.

17. The computing device of claim 15, further comprising software instructions stored in the memory for causing the computing device to:
transparently to the user and by a security application:
intercept a received encrypted message from the group;
obtain the first secret from the secrets file in response to intercepting the received encrypted message;
decrypt the received encrypted message from the chat application to obtain a received message; and
send the received message to a chat application; and
open, by the chat application, the received message.

18. The computing device of claim 15, further comprising software instructions stored in the memory for causing the computing device to:
store a plurality of secrets in the secrets file,
wherein the plurality of secrets comprises the first secret, and
wherein the plurality of secrets is organized according to a type of communication associated with each secret of the plurality of secrets.

19. The computing device of claim 15, further comprising software instructions stored in the memory for causing the computing device to:
extract a second secret from the second message digest;
store the encrypted second secret in the secrets file prior to encrypting the secrets file;
generate a fourth message digest using the first secret and the second secret; and
extract an encryption key from the fourth message digest, wherein communication between members of the first group are encrypted using the encryption key.

* * * * *